US010218892B2

(12) United States Patent
Ito et al.

(10) Patent No.: US 10,218,892 B2
(45) Date of Patent: Feb. 26, 2019

(54) INFORMATION PROCESSING DEVICE, IMAGING DEVICE, IMAGING SYSTEM, AND INFORMATION PROCESSING METHOD

(71) Applicant: SONY CORPORATION, Tokyo (JP)

(72) Inventors: Ryogo Ito, Tokyo (JP); Shiro Eshita, Tokyo (JP); Kazuma Akamatsu, Tokyo (JP); Yoko Fukata, Tokyo (JP); Megumi Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/314,626

(22) PCT Filed: Apr. 10, 2015

(86) PCT No.: PCT/JP2015/002022
§ 371 (c)(1),
(2) Date: Nov. 29, 2016

(87) PCT Pub. No.: WO2015/194077
PCT Pub. Date: Dec. 23, 2015

(65) Prior Publication Data
US 2017/0201670 A1 Jul. 13, 2017

(30) Foreign Application Priority Data
Jun. 19, 2014 (JP) .................. 2014-126364

(51) Int. Cl.
*H04N 5/232* (2006.01)
*G03B 17/56* (2006.01)
*G03B 29/00* (2006.01)
*G03B 3/12* (2006.01)

(52) U.S. Cl.
CPC ....... *H04N 5/23203* (2013.01); *G03B 17/565* (2013.01); *H04N 5/23245* (2013.01); *H04N 5/23293* (2013.01); *G03B 3/12* (2013.01); *G03B 29/00* (2013.01); *G03B 2217/002* (2013.01)

(58) Field of Classification Search
CPC ........... H04N 5/23203; H04N 5/23245; H04N 5/23293; G03B 29/00; G03B 3/12; G03B 17/565
USPC ..... 348/211.9, 211.8, 211.99, 211.2, 208.11, 348/211.14, 373–376, 220.1, 333.01, 335; 396/541, 535, 529, 71, 530, 56, 57
See application file for complete search history.

(56) References Cited

U.S. PATENT DOCUMENTS

| | | | |
|---|---|---|---|
| 6,888,574 B1 | 5/2005 | Asakura | |
| 9,742,978 B2 * | 8/2017 | Ito | H04N 5/23206 348/211.8 |
| 10,069,999 B2 * | 9/2018 | Ito | H04N 1/32122 348/360 |
| 2007/0098385 A1 | 5/2007 | Tanaka et al. | |

(Continued)

FOREIGN PATENT DOCUMENTS

| | | |
|---|---|---|
| JP | 2006-148346 A | 6/2006 |
| JP | 2009-094591 A | 4/2009 |
| JP | 2010-004217 A | 1/2010 |

*Primary Examiner* — Marly S Camargo
(74) *Attorney, Agent, or Firm* — Chip Law Group

(57) ABSTRACT

There is provided an information processing device including a control part configured to control an imaging operation on the basis of a contact state of an object in a lens barrel that houses an optical system.

15 Claims, 13 Drawing Sheets

(56) References Cited

U.S. PATENT DOCUMENTS

| | | | |
|---|---|---|---|
| 2007/0268371 A1* | 11/2007 | Misawa | H04N 5/2252 |
| | | | 348/207.99 |
| 2012/0229661 A1* | 9/2012 | Sekiguchi | A61B 5/0205 |
| | | | 348/208.4 |
| 2012/0307079 A1* | 12/2012 | Yumiki | H04N 5/23203 |
| | | | 348/207.1 |
| 2013/0141640 A1 | 6/2013 | Kim et al. | |

* cited by examiner

|  | HOLDING OF IMAGING DEVICE IS DETECTED | HOLDING OF IMAGING DEVICE IS NOT DETECTED |
|---|---|---|
| IMAGING DEVICE IS ATTACHED TO INFORMATION PROCESSING DEVICE | SET MOVING IMAGE MODE<br><br>DISPLAY MOVING IMAGE PHOTOGRAPHING UI | SET STILL IMAGE MODE<br><br>DISPLAY INCORPORATED TYPE CAMERA UI |
| IMAGING DEVICE IS NOT ATTACHED TO INFORMATION PROCESSING DEVICE | DISPLAY REMOTE UI | DISPLAY REMOTE UI |

| | | HOLDING OF IMAGING DEVICE IS DETECTED | HOLDING OF IMAGING DEVICE IS NOT DETECTED |
|---|---|---|---|
| IMAGING DEVICE IS ATTACHED TO INFORMATION PROCESSING DEVICE | IMAGING DEVICE IS ATTACHED TO SIDE FACE OF INFORMATION PROCESSING DEVICE | SET MOVING IMAGE MODE | SET MOVING IMAGE MODE |
| | | DISPLAY SECOND MOVING IMAGE PHOTOGRAPHING UI | DISPLAY SECOND MOVING IMAGE PHOTOGRAPHING UI |
| | IMAGING DEVICE IS ATTACHED TO FRONT FACE OF INFORMATION PROCESSING DEVICE | SET MOVING IMAGE MODE | SET STILL IMAGE MODE |
| | | DISPLAY FIRST MOVING IMAGE PHOTOGRAPHING UI | DISPLAY INCORPORATED TYPE CAMERA UI |
| IMAGING DEVICE IS NOT ATTACHED TO INFORMATION PROCESSING DEVICE | | DISPLAY REMOTE UI | DISPLAY REMOTE UI |

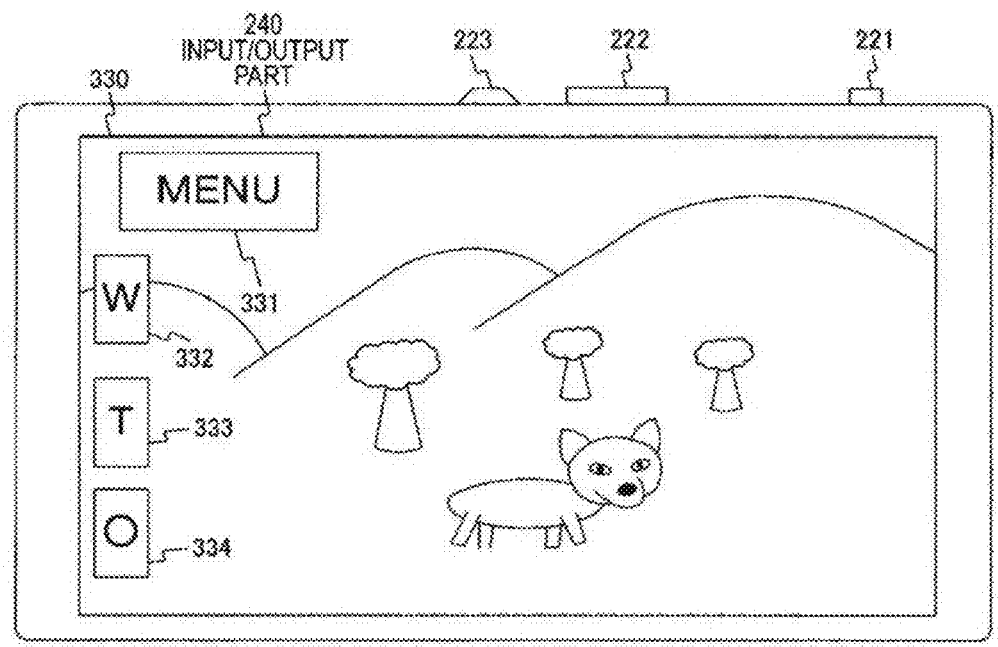

FIG. 13

INFORMATION PROCESSING DEVICE, IMAGING DEVICE, IMAGING SYSTEM, AND INFORMATION PROCESSING METHOD

CROSS REFERENCE TO RELATED APPLICATIONS

This application is a U.S. National Phase of International Patent Application No. PCT/JP2015/002022 filed on Apr. 10, 2015, which claims priority benefit of Japanese Patent Application No. JP 2014-126364 filed in the Japan Patent Office on Jun. 19, 2014. Each of the above-referenced applications is hereby incorporated herein by reference in its entirety.

TECHNICAL FIELD

The present technology relates to an information processing device and an imaging device. In detail, the present technology relates to the information processing device that controls imaging operation, an imaging device, an imaging system and a controlling method thereof, and a program that makes a computer execute the method.

BACKGROUND ART

An imaging device such as a digital still camera or a digital video camera (for instance, a camera integrated type recorder) that images an object, generates an image (image data) and records the image as contents has been widely spread. Also, there exists a wireless communication technology of exchanging various kinds of data utilizing wireless communication.

Also, there exists a technology of operating an imaging device by another device utilizing wireless communication. For instance, there is proposed an electronic device that, when a contact operation to an operation switch image displayed at a display part is detected, makes an imaging device execute an operation corresponding to the operation switch image on which the contact operation has been performed (for instance, see PTL 1).

CITATION LIST

Patent Literature

[PTL 1]
JP 2009-94591A

SUMMARY

Technical Problem

In the above-mentioned related art, since the imaging device is operated by the electronic device utilizing the wireless communication, for instance, even when the imaging device and the electronic device are at a distance, the imaging device is operated using the electronic device.

Here, for instance, it is assumed that an imaging operation is performed using an information processing device capable of operating an imaging device utilizing the wireless communication and the imaging device. In this case, it is assumed that a using mode of the imaging device and the information processing device is different depending on a connection relation between the imaging device and the information processing device and a way of holding the imaging device or the like. Therefore, in the case of performing the imaging operation using the imaging device and the information processing device, it is important to appropriately control the imaging operation according to the using mode.

The present technology is created in consideration of such a situation, and it is desirable to appropriately control an imaging operation according to a using mode of a device.

Solution to Problem

The present technology has been made in order to solve the above problems, and an embodiment of the present technology is an information processing device including a control part configured to control an imaging operation on the basis of a contact state of an object in a lens barrel that houses an optical system, a control method thereof, and a program that makes a computer execute the method. Thus, there is an effect of controlling an imaging operation on the basis of a contact state of an object in a lens barrel.

In this embodiment, the control part may determine whether or not the lens barrel is in a state of being held by a user on the basis of whether or not contact of an object is detected on a side face of the lens barrel, and control the imaging operation on the basis of the determination result. Thus, there is an effect of determining whether or not the lens barrel is in the state of being held by a user on the basis of whether or not the contact of an object is detected on the side face of the lens barrel, and controlling the imaging operation on the basis of the determination result.

In this embodiment, the control part may determine that the lens barrel is in the state of being held by a user in a case that the contact of the object is detected in a prescribed area on the side face of the lens barrel. Thus, there is an effect of determining that the lens barrel is in the state of being held by a user in the case that the contact of an object is detected in the prescribed area on the side face of the lens barrel.

In this embodiment, a wireless communication part configured to perform wireless communication with an imaging device including the lens barrel may be further included, the imaging device may transmit contact information related to a contact state of an object in the lens barrel to the information processing device utilizing the wireless communication, and the control part may control the imaging operation on the basis of the contact information. Thus, there is an effect that the imaging device transmits the contact information related to the contact state of an object in the lens barrel to the information processing device utilizing the wireless communication, and the information processing device controls the imaging operation on the basis of the contact information.

In this embodiment, the control part may control the imaging operation on the basis of a relative positional relation with the imaging device and the contact information. Thus, there is an effect of controlling the imaging operation on the basis of the relative positional relation with the imaging device and the contact information.

In this embodiment, the control part may perform control for setting a moving image mode to the imaging device in a case that the imaging device is attached to the information processing device and the contact of the object is detected by the imaging device. Thus, there is an effect of setting the moving image mode to the imaging device in the case that the imaging device is attached to the information processing device, and the contact of the object is detected by the imaging device.

In this embodiment, the control part may perform control of making a display part display a display screen corresponding to the moving image mode in the case that the imaging device is attached to the information processing device and the contact of the object is detected by the imaging device. Thus, there is an effect of making the display part display the display screen corresponding to the moving image mode in the case that the imaging device is attached to the information processing device, and the contact of the object is detected by the imaging device.

In this embodiment, the control part may perform control for setting a still image mode to the imaging device in a case that the imaging device is attached to the information processing device and the contact of the object is not detected by the imaging device. Thus, there is an effect of setting the still image mode to the imaging device in the case that the imaging device is attached to the information processing device, and the contact of the object is not detected by the imaging device.

In this embodiment, the control part may perform control of making a display part display a display screen corresponding to the still image mode in the case that the imaging device is attached to the information processing device and the contact of the object is not detected by the imaging device. Thus, there is an effect of making the display part display the display screen corresponding to the still image mode in the case that the imaging device is attached to the information processing device, and the contact of the object is not detected by the imaging device.

In this embodiment, the control part may control the imaging operation on the basis of a mounting position of the imaging device in the information processing device and the contact information. Thus, there is an effect of controlling the imaging operation on the basis of the mounting position of the imaging device in the information processing device and the contact information.

In this embodiment, the control part may perform control of setting an imaging mode for performing the imaging operation on the basis of the contact state of the object. Thus, there is an effect of setting the imaging mode on the basis of the contact state of the object.

In this embodiment, the control part may perform control of changing a display form of a display screen that displays an image related to the imaging operation on the basis of the contact state of the object. Thus, there is an effect of changing the display form of the display screen that displays the image related to the imaging operation on the basis of the contact state of the object.

Another embodiment of the present technology is a control method of an imaging device including a control part configured to control an imaging operation on the basis of a contact state of an object in a lens barrel that houses an optical system. Thus, there is an effect of controlling the imaging operation on the basis of the contact state of the object in the lens barrel.

Another embodiment of the present technology is an imaging system including an imaging device that includes a contact detection part configured to detect contact of an object in a lens barrel that houses an optical system, and a control part configured to perform control of transmitting contact information related to the detected contact of the object to the information processing device utilizing wireless communication, and an information processing device that includes a wireless communication part configured to perform the wireless communication with the imaging device, and a control part configured to control an imaging operation performed using the imaging device on the basis of the contact information; a control method thereof; and a program that makes a computer execute the method. Thus, there is an effect that the imaging device, when the contact of the object in the lens barrel is detected, transmits the contact information related to the detected contact of the object to the information processing device utilizing the wireless communication, and the information processing device controls the imaging operation performed using the imaging device on the basis of the contact information from the imaging device.

Advantageous Effects of Invention

According to the present technology, an excellent effect of appropriately controlling the imaging operation according to a using mode of the device can be demonstrated. The effect described here is not limited thereto, and may be one of the effects described in the present disclosure.

BRIEF DESCRIPTION OF DRAWINGS

FIG. 5 is a diagram illustrating an example of a relation between an imaging mode set to the imaging device 100 and the information processing device 200 and a UI displayed at the information processing device 200 in the first embodiment of the present technology.

FIG. 12 is a diagram illustrating an example of a relation between the imaging mode set to the imaging device 100 and the information processing device 200 and the UI displayed at the information processing device 200 in the second embodiment of the present technology.

FIG. 13 is a diagram illustrating a display example of the display screen displayed at the input/output part 240 in the second embodiment of the present technology.

DESCRIPTION OF EMBODIMENTS

Hereinafter, modes for carrying out the present technology (called embodiments, hereinafter) will be described. Description will be given in the following order.

1. First embodiment (an example of setting an imaging mode and a UI on the basis of a holding state of an imaging device)

2. Second embodiment (an example of setting the imaging mode and the UI on the basis of the holding state of the imaging device and an attaching position of the imaging device in an information processing device)

1. First Embodiment

"Appearance Configuration Example of Imaging Device"

Figure 1A:
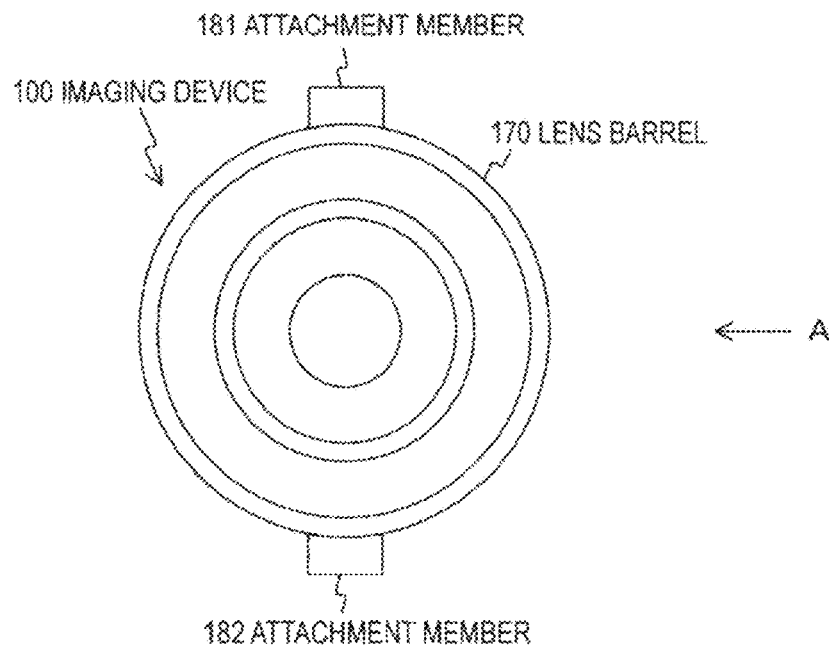
FIG. 1 is a diagram illustrating an appearance configuration of an imaging device 100 in a first embodiment of the present technology.
Figure 1B:
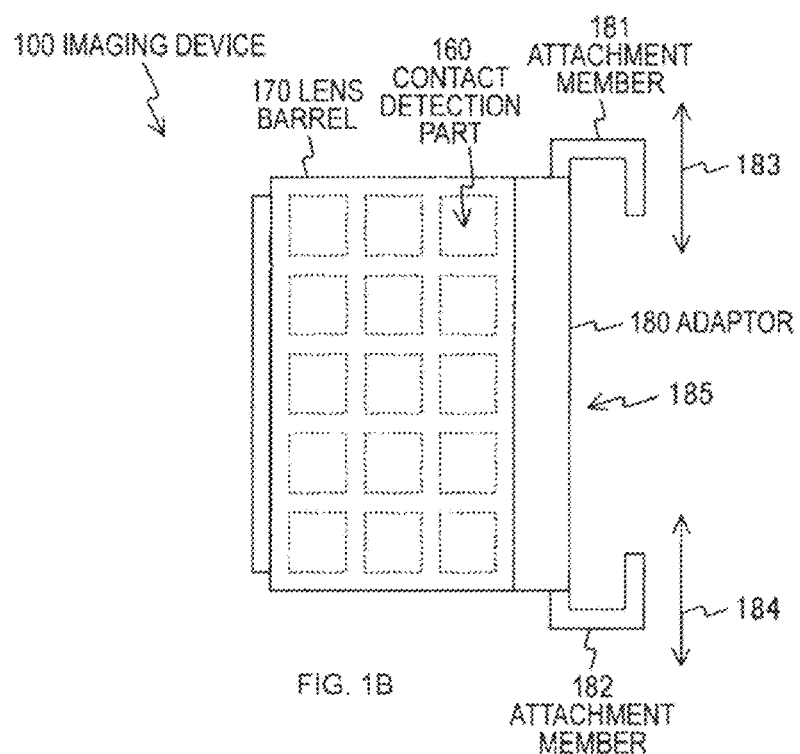

FIG. 1 is a diagram illustrating an appearance configuration of an imaging device 100 in the first embodiment of the present technology. A front view of the imaging device 100 is illustrated in FIG. 1a, and a side view (a side view in the case of view from an arrow A) of the imaging device 100 is illustrated in FIG. 1b.

Also, in the embodiment of the present technology, an example is illustrated in which the imaging device 100 is a cylindrical (columnar) imaging device (for instance, a lens style camera). That is, an example is illustrated in which the shape of the imaging device 100 is a shape of a lens part alone taken out of a general imaging device (for instance, an incorporated type camera). The imaging device 100 includes operation members such as a zoom lever and a shutter button; however, illustrations thereof are omitted in FIG. 1 or the like. Also, the imaging device 100 is, for instance, embodied by a digital still camera or a digital video camera (for instance, a camera incorporated type recorder).

The imaging device 100 includes a contact detection part 160 and a lens barrel 170. The lens barrel 170 houses individual members of an optical system and an imaging system or the like.

The contact detection part 160 detects contact on a side face of the imaging device 100 (a side face of the lens barrel 170). In FIG. 1, for easy description, a plurality of sensors configuring the contact detection part 160 are schematically indicated by dotted-line rectangles. Also, for the sensor configuring the contact detection part 160, one sensor with a wide area may be installed or a plurality of sensors with a narrow area may be installed. Also, the sensor configuring the contact detection part 160 may be arranged on the entire surface of the side face of the imaging device 100 (the side face of the lens barrel 170) or may be installed only on part of the side face of the imaging device 100. In the case of installing the sensor configuring the contact detection part 160 only on part of the side face of the imaging device 100, it is preferable to install the sensor on a part assumed to be held by a user in the imaging device 100. The part assumed to be held by a user in the imaging device 100 is, for instance, a right side part of the imaging device 100 (for instance, a part held with the right hand 2 illustrated in FIG. 4b).

Also, to the imaging device 100, an adaptor 180 is attached. The adaptor 180 is an attachment member (attachment) that includes attachment members 181 and 182, and is attachable and detachable to/from a rear surface (a surface on the opposite side of a surface on a lens side illustrated in FIG. 1a) of the imaging device 100. While an example of configuring the lens barrel 170 and the adaptor 180 as different members is illustrated in FIG. 1, the lens barrel 170 and the adaptor 180 may be configured as one body.

The attachment members 181 and 182 are holding members used when attaching the imaging device 100 to another device (for instance, an information processing device 200 illustrated in FIG. 2). For instance, by moving the attachment member 181 in a direction of an arrow 183 and moving the attachment member 182 in a direction of an arrow 184 corresponding to a shape and a size of another device, the imaging device 100 can be attached to the device. That is, the attachment members 181 and 182 are holding members for fixing the imaging device 100 to another device. Also, an attachment surface in the case of attaching the imaging device 100 to another device is illustrated as a mounting surface 185 (a surface on the opposite side of a surface on a lens side illustrated in FIG. 1a). Also, an example of the case of attaching the imaging device 100 to another device is illustrated in FIG. 2.

In this way, the imaging device 100 can, for instance, perform a normal imaging operation and be attached to another device (for instance, a smartphone) and used. Also, in the case of being attached to another device and used, the imaging device 100 can be operated by remote control using another device.

"Attachment Example of Imaging Device"

FIG. 2 is a diagram illustrating an appearance configuration in the case of attaching the imaging device 100 to the information processing device 200 in the first embodiment of the present technology.

Figure 2A:
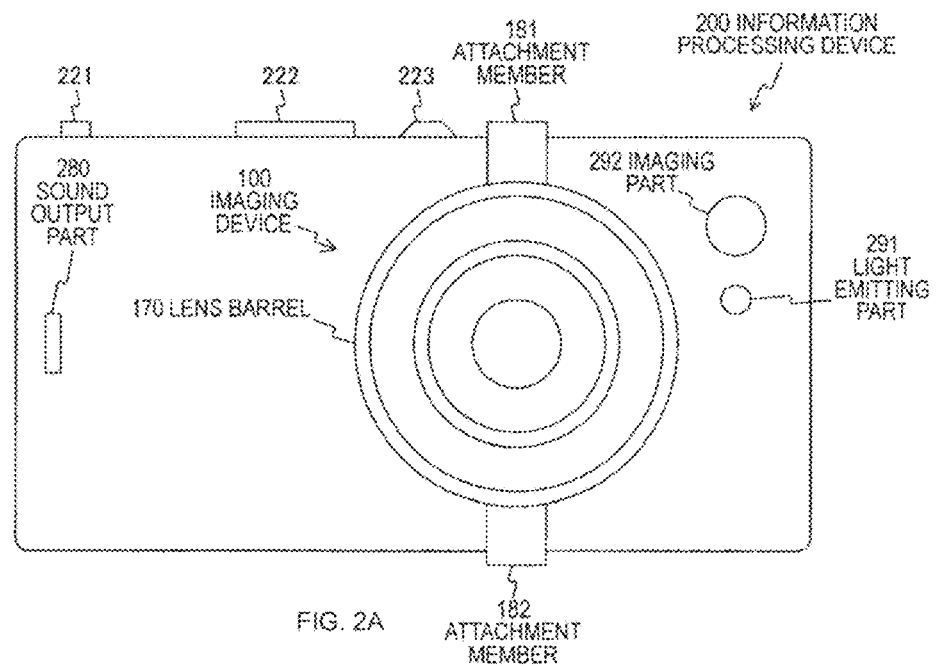
FIG. 2 is a diagram illustrating an appearance configuration when attaching the imaging device 100 to an information processing device 200 in the first embodiment of the present technology.
Figure 2B:
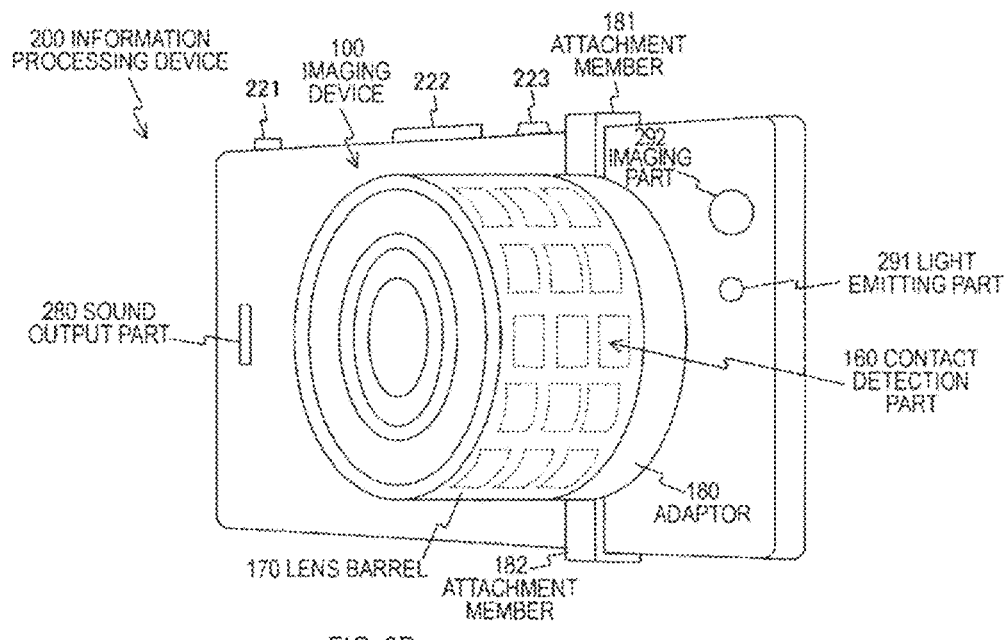

An example of the case of attaching the imaging device 100 to one surface (a surface provided with an imaging part 292) of the information processing device 200 is illustrated in FIG. 2a and FIG. 2b. In FIG. 2a, a front view in the case of attaching the imaging device 100 to the information processing device 200 is illustrated. Also, in FIG. 2b, a perspective view in the case of attaching the imaging device 100 to the information processing device 200 is illustrated.

The information processing device 200 includes operation members 221 to 223, an input/output part 240 (illustrated in FIG. 3 and FIG. 5), a sound output part 280, a light emitting part 291, and the imaging part 292. Also, the information processing device 200 is embodied by an information processing device such as a smartphone, or a tablet terminal, for instance.

The operation members 221-223 are the operation members used when performing various kinds of operation input. For instance, the operation member 221 is the operation member (the shutter button) used when performing a shutter operation (an operation for recording an image (image data) generated by the imaging part 292 as image contents) of the information processing device 200. Also, the operation member 222 is the operation member (a sound volume adjustment button (a sound volume bar)) used when performing an operation for adjusting a sound volume output from the sound output part 280. The operation member 223 is the operation member (the power button) used when performing ON/OFF operations of a power source of the information processing device 200.

The input/output part 240 displays various kinds of images, and receives the operation input from a user on the basis of the detected state of an object which is adjacent to or in contact with a display surface of the input/output part 240.

The sound output part 280 outputs various kinds of sound information.

The light emitting part 291 is a light emitting device which emits light to an object. The light emitting part 291 is used when performing an imaging operation using the information processing device 200 in an environment where it is difficult to expect sufficient brightness such as the nighttime or indoor, for instance.

The imaging part 292 images an object and generates an image (image data).

As illustrated in FIG. 2, by the attachment members 181 and 182 of the adaptor 180 holding a main body of the information processing device 200 between them, the imaging device 100 can be fixed to the information processing device 200. Also, the imaging device 100 may be attached to another part (a part other than the part illustrated in FIG. 2) in the information processing device 200. Attachment examples of the imaging device 100 to other parts in the information processing device 200 are illustrated in FIG. 11, FIG. 15, and the like.

"Functional Configuration Example of Imaging Device and Information Processing Device"

Figure 3:
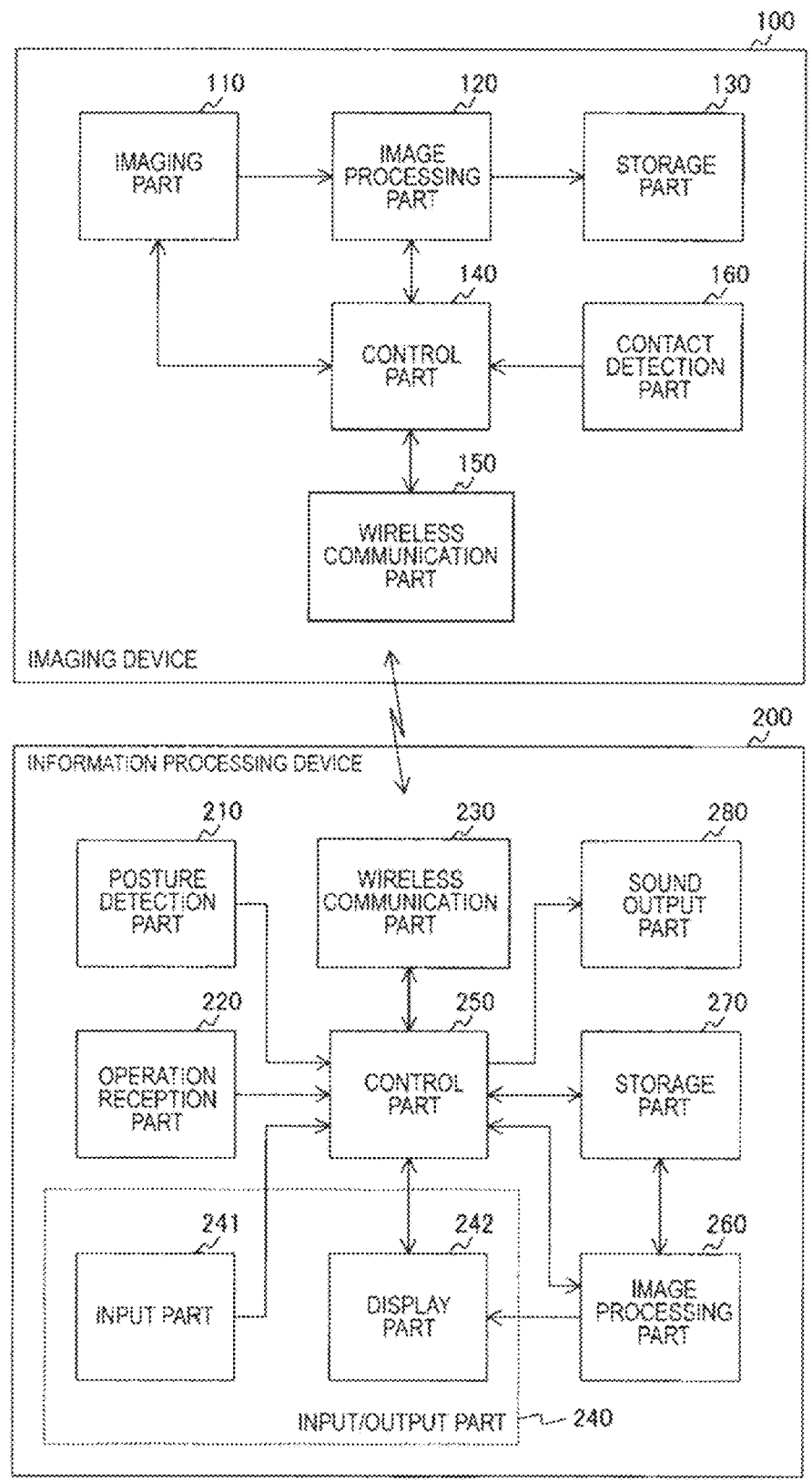
FIG. 3 is a block diagram illustrating a functional configuration example of the imaging device 100 and the information processing device 200 in the first embodiment of the present technology.

FIG. 3 is a block diagram illustrating a functional configuration example of the imaging device 100 and the information processing device 200 in the first embodiment of the present technology. Also, an imaging system constituted of the imaging device 100 and the information processing device 200 is one example of an imaging system described in the scope of claims.

"Functional Configuration Example of Imaging Device"

The imaging device 100 includes an imaging part 110, an image processing part 120, a storage part 130, a control part 140, a wireless communication part 150, and the contact detection part 160.

The imaging part 110 images an object and generates an image (image data) on the basis of control of the control part 140, and outputs the generated image to the image processing part 120. The imaging part 110 is, for instance, constituted of an optical system (a plurality of lenses) and an imaging element. Also, individual parts (for instance, a zoom lens, a focus lens, a diaphragm) of the imaging part 110 are controlled under the control of the control part 140. In the embodiment of the present technology, it is assumed that a reference to "image" includes senses of both image itself and image data for displaying the image.

The image processing part 120 executes predetermined image processing (for instance, demosaic processing) for the image output from the imaging part 110 under the control of the control part 140, and the image subjected to the image processing is stored in the storage part 130. The image subjected to the image processing by the image processing part 120 may be transmitted to the information processing device 200 utilizing wireless communication and stored in a storage part 270.

The storage part 130 is a recording medium that stores the image subjected to the image processing by the image processing part 120 as contents (for instance, a still image file, a moving image file). The storage part 130 may be built in the imaging device 100 or may be attachable and detachable to/from the imaging device 100.

The control part 140 controls the individual parts in the imaging device 100 on the basis of a control program. For instance, the control part 140 controls the individual parts on the basis of the operation input received by the operation members (now shown) such as the zoom lever or the shutter button provided in the imaging device 100. Also, the control part 140 controls the individual parts on the basis of control information from the information processing device 200 received through the wireless communication part 150. That is, the imaging device 100 can be remotely controlled using the information processing device 200.

The wireless communication part 150 transmits and receives individual pieces of information (for instance, control data, image data) to/from another information processing device (for instance, the information processing device 200) utilizing the wireless communication under the control of the control part 140.

Here, as the wireless communication, for instance, a wireless local area network (LAN) may be used. As the wireless LAN, for instance, wireless fidelity (Wi-Fi) may be used. Also, as the wireless communication, for instance, the wireless communication of Bluetooth®, near field communication (NFC), infrared rays, and portable radio waves or the like may be used.

Also, a plurality of wireless communication systems may be used. For instance, at the start of the wireless communication, only a power source is turned on and data (for instance, a service set identifier (SSID)) related to the Wi-Fi is exchanged by the NFC. Then, data is exchanged thereafter through the Wi-Fi.

Also, for instance, when detecting attachment of the imaging device 100 to the information processing device 200, exchange of data by the NFC may be used. Also, the image data and the control data can be exchanged between the imaging device 100 and the information processing device 200 utilizing the Wi-Fi.

The contact detection part 160 detects contact of an object on the side face of the imaging device 100 (the side face of the lens barrel 170), and outputs the detection result (information related to a contact state of the object (contact information)) to the control part 140. For instance, the contact detection part 160 outputs information (for instance, a contact position and a contact area) related to an area where the contact of the object is detected on the side face of the imaging device 100 (the side face of the lens barrel 170) to the control part 140 as the detection result (contact information). Here, the side face of the imaging device 100 means a surface other than end faces (the surface on the lens side illustrated in FIG. 1a, and the surface on the opposite side) at both ends of the imaging device 100 in a cylindrical shape.

Also, as the contact detection part 160, for instance, one or a plurality of sensors can be used. For instance, one or a plurality of touch sensors (for instance, electrostatic capacity type touch sensors) can be used. Also, on the side face of the imaging device 100, a detection member (for instance, a switch) for detecting the contact of the object may be provided, and the contact of the object may be detected on the side face of the imaging device 100 using the change of the detection member.

Also, the control part 140 transmits the contact information outputted from the contact detection part 160 through the wireless communication part 150 to the information processing device 200.

"Functional Configuration Example of Information Processing Device"

The information processing device 200 includes a posture detection part 210, an operation reception part 220, a wireless communication part 230, the input/output part 240, a control part 250, an image processing part 260, the storage part 270, and the sound output part 280.

The posture detection part 210 detects a posture of the information processing device 200 by detecting an acceleration, movement and inclination or the like of the information processing device 200, and outputs posture information related to the detected posture to the control part 250. As the posture detection part 210, for instance, various kinds of sensors such as a gyro sensor or an acceleration sensor may be used.

The operation reception part 220 is the operation reception part that receives the operation performed by the user, and outputs the control information (operation information) according to the received operation contents to the control part 250. The operation reception part 220 corresponds to, for instance, the operation members 221 to 223 illustrated in FIG. 2.

The wireless communication part 230 transmits and receives individual pieces of information (for instance, the control data, the image data) to/from another information processing device (for instance, the imaging device 100) utilizing the wireless communication under the control of the control part 250. As the wireless communication, for instance, the above described wireless LAN (for instance, the Wi-Fi), the NFC, Bluetooth, infrared rays or portable radio waves or the like may be used. Also, the plurality of wireless communication systems may be used.

For the input/output part 240, an input part 241 and a display part 242 are configured as one body. Also, the input/output part 240 displays various kinds of images on the display part 242 under the control of the control part 250, and receives the operation input from the user by the input part 241 on the basis of the detected state of an object which is adjacent to or in contact with a display surface of the display part 242. The input part 241 outputs the control information according to the received operation input to the control part 250.

For instance, as the input part 241, there may be used an electrostatic type (electrostatic capacity type) touch panel that detects contact or approach of a conductive object (for instance, a finger of a person) on the basis of change in electrostatic capacity. Also, for instance, as the display part 242, there may be used a display panel such as a liquid crystal display (LCD) or an organic electro luminescence (EL) panel. Then, the input/output part 240 is configured by superimposing a transparent touch panel on the display surface of the display panel, for instance.

For instance, the user can operate the information processing device 200 and the imaging device 100 by performing a contact operation (or an adjacent operation) of an operation object or the like displayed at the display part 242. Here, the operation object is displayed at the input/output part 240 like a shutter button 301 and operation objects 311 illustrated in FIG. 6, for instance, and is an operation button (a graphical user interface (GUI) button) or the like for performing the operation input.

The control part 250 controls the individual parts in the information processing device 200 on the basis of a control program. For instance, the control part 250 determines the posture of the information processing device 200 on the basis of the posture information from the posture detection part 210, and switches a display form of the display screen to be displayed at the input/output part 240 based on the determination result. For instance, the control part 250 determines a vertical direction of the posture of the information processing device 200 on the basis of the posture information from the posture detection part 210, and switches the vertical direction of the display screen to be displayed at the input/output part 240 on the basis of the determination result.

Also, for instance, the control part 250 controls the imaging operation on the basis of a contact state of an object (for instance, a holding state of a user) in the lens barrel 170 of the imaging device 100. For instance, the control part 250 determines whether or not the lens barrel 170 is in the state of being held by a user on the basis of whether or not the contact of the object is detected on the side face of the lens barrel 170. In this case, the control part 250 can determine that the lens barrel 170 is in the state of being held by a user in the case that the contact of the object is detected in a prescribed area on the side face of the lens barrel 170. Here, the prescribed area on the side face of the lens barrel 170 is the part assumed to be held by a user in the imaging device 100 in the case of being attached to the information processing device 200, for instance. The part is, for instance, the right side part of the imaging device 100 (for instance, the part held with the right hand 2 illustrated in FIG. 4b). Also, for instance, the control part 250 may determine that the lens barrel 170 is in the state of being held by a user in the case that the contact of the object is detected in an area equal to or more than a threshold (for instance, an area of 30% or more) on the side face of the lens barrel 170. Then, the control part 250 controls the imaging operation on the basis of the determination result.

Here, the control part 250 can determine the contact state of the object (for instance, a holding state of a user) in the lens barrel 170 of the imaging device 100 on the basis of the contact information transmitted from the imaging device 100. That is, the control part 250 can control the imaging operation on the basis of the contact information.

Also, for instance, the control part 250 can control the imaging operation on the basis of a relative positional relation with the imaging device 100, and the contact information. For instance, the control part 250 performs control for setting a moving image mode to the imaging device 100 in the case that the imaging device 100 is attached to the information processing device 200 and the contact of the object is detected by the imaging device 100. In this case, the control part 250 performs control of making the input/output part 240 display a display screen (for instance, a moving image photographing UI illustrated in FIG. 7) corresponding to the moving image mode.

Also, for instance, the control part 250 performs control for setting a still image mode to the imaging device 100 in the case that the imaging device 100 is attached to the information processing device 200 and the contact of the object is not detected by the imaging device 100. In this case, the control part 250 performs control of making the input/output part 240 display a display screen (for instance, an incorporated type camera UI illustrated in FIG. 8) corresponding to the still image mode.

In this way, the control part 250 can perform control of setting an imaging mode for performing the imaging operation on the basis of the contact state of the object in the lens barrel 170 of the imaging device 100. Also, the control part 250 can perform control of changing the display form of the display screen that displays an image related to the imaging operation on the basis of the contact state of the object in the lens barrel 170 of the imaging device 100.

The image processing part 260 executes predetermined image processing for the image generated by the imaging device 100 and the image generated by the imaging part 292 (illustrated in FIG. 2a and FIG. 2b) under the control of the control part 250, and makes the display part 242 display the image subjected to the image processing. Also, the image processing part 260 stores the images in the storage part 270 under the control of the control part 250.

Also, the image processing part 260 makes the display part 242 display the display screen to be used when the imaging operation using the imaging device 100 is being performed, under the control of the control part 250.

The storage part 270 is a recording medium that stores individual pieces of information under the control of the control part 250. For instance, in the storage part 270, the image generated by the imaging device 100 and the image generated by the imaging part 292 (illustrated in FIG. 2a and FIG. 2b) are stored as contents (for instance, the still image file, the moving image file). The storage part 270 may be built in the information processing device 200 or may be attachable and detachable to/from the information processing device 200.

The sound output part 280 outputs sound information under the control of the control part 250. The sound output part 280 can be embodied by a speaker, for instance.

"Use Example of Imaging Device and Information Processing Device"

FIG. 4 is a diagram illustrating a use example of the imaging device 100 and the information processing device 200 in the first embodiment of the present technology. Also, in FIG. 4, for easy description, a part of the imaging device 100 and the information processing device 200 is illustrated in a simplified manner.

Figure 4A:
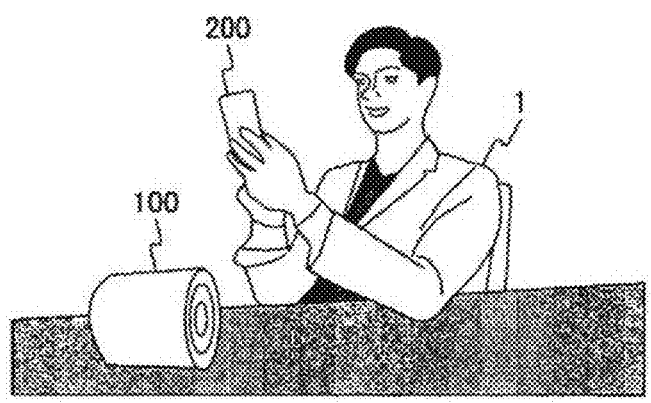
FIG. 4 is a diagram illustrating a use example of the imaging device 100 and the information processing device 200 in the first embodiment of the present technology.

FIG. 4a illustrates one example of the case of performing the imaging operation by an operation using the information processing device 200 without attaching the imaging device 100 to the information processing device 200. For example, a user 1 can use the information processing device 200 in a vertical state.

Here, it is assumed that the vertical state means a state of turning a longitudinal direction of the information processing device 200 to be the same (almost the same, including the state close to a horizontal direction) as a vertical direction (a direction parallel to a gravity direction). For instance, by rotating the information processing device 200 in a horizontal state by 90 degrees with an axis orthogonal to a display surface of the input/output part 240 as a rotation axis, the information processing device 200 can be turned to the vertical state. Similarly, by rotating the information processing device 200 in the vertical state by 90 degrees with the axis orthogonal to the display surface of the input/output part 240 as the rotation axis, the information processing device 200 can be turned to the horizontal state. Also, the horizontal state and the vertical state can be determined on the basis of the posture information from the posture detection part 210.

Also, it is assumed that the horizontal state means a state of turning the longitudinal direction of the information processing device 200 to be the same (almost the same, including the state close to the horizontal direction) as the horizontal direction (a direction vertical to the gravity direction). For instance, it is the state illustrated in FIG. 2a and FIG. 2b.

Figure 4B:
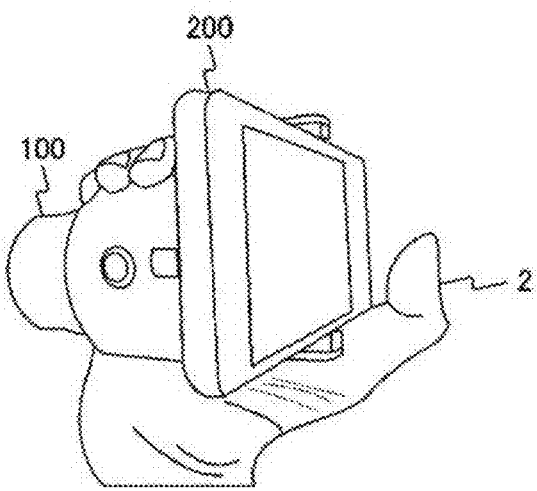
Figure 4C:
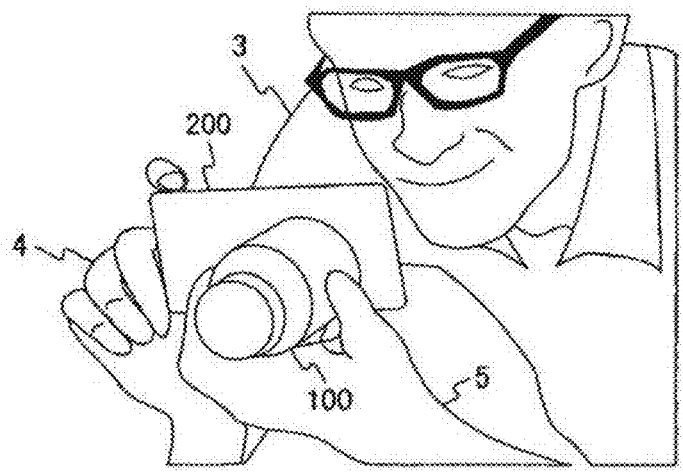

In FIG. 4b and FIG. 4c, an example of the case of attaching the imaging device 100 to the information processing device 200 and using it is illustrated. For instance, as illustrated in FIG. 2a and FIG. 2b, the imaging device 100 can be attached to one surface (a surface on the opposite side of a surface provided with the input/output part 240) of the information processing device 200.

Here, for instance, the case of photographing a moving image using a digital video camera (for instance, a camera incorporated type recorder) which is widely spread at present is assumed. For instance, the case of using the digital video camera and photographing a moving image while confirming a monitor is assumed. In this case, a photographing style of performing photographing while holding a right side part of a part (lens barrel part) where a lens is stored as if wrapping it with the right hand of a user is easy to take and is assumed to be popular.

Here, even in photographing using the imaging device 100 and the information processing device 200, it is possible to photograph a moving image. Therefore, if photographing can be performed in the photographing style of photographing a moving image using the digital video camera that is widely spread at present in moving image photographing using the imaging device 100 and the information processing device 200 as well, it is assumed that it is easy for a user to perform photographing. Therefore, in the embodiment of the present technology, as illustrated in FIG. 4b, in the case that the right side part of the imaging device 100 is held so as to be wrapped with the right hand 2 of a user, the moving image mode is set and the moving image photographing UI is displayed.

Also, for instance, the case of photographing a still image using an incorporated type camera (for instance, a digital still camera (for instance, a single-lens reflex camera)) which is widely spread at present is assumed. For instance, the case of using the incorporated type camera and photographing a still image while confirming a monitor is assumed. In this case, a photographing style of performing photographing while lightly holding a part (for instance, a lower side part) of the part (lens barrel part) where the lens is stored with the left hand of a user while holding a main body of the incorporated type camera with the right hand of the user is easy to take and is assumed to be popular.

Here, even in photographing using the imaging device 100 and the information processing device 200, it is possible to photograph a still image. Therefore, if photographing can be performed in the photographing style of photographing a still image using the incorporated type camera that is widely spread at present in still image photographing using the imaging device 100 and the information processing device 200 as well, it is assumed that it is easy for a user to perform photographing. Therefore, in the embodiment of the present technology, as illustrated in FIG. 4c, in the case that the lower side part of the imaging device 100 is lightly held with the left hand 5 of a user 3 while the information processing device 200 is held with the right hand 4 of the user 3, the still image mode is set and the incorporated type camera UI is displayed. Also, in an example illustrated in FIG. 4c, since a contact area of the left hand 5 of the user 3 at the lower side part of the imaging device 100 is small, the contact of the left hand 5 of the user 3 is not detected.

By setting the imaging mode and the UI in this way, convenience of a user can be further improved. That is, the imaging device 100 can be used without discomfort like a digital still camera or an incorporated type camera.

"Setting Example of Imaging Mode and UI"

FIG. 5 is a diagram illustrating an example of a relation between the imaging mode set to the imaging device 100 and the information processing device 200 and the UI displayed at the information processing device 200 in the first embodiment of the present technology.

For instance, in the case that the imaging device 100 is attached to the information processing device 200, a user is assumed to perform the imaging operation using the imaging device 100 and information processing device 200. Therefore, the imaging mode and the UI display are set according to a holding degree of the imaging device 100 by the user.

Figure 7:
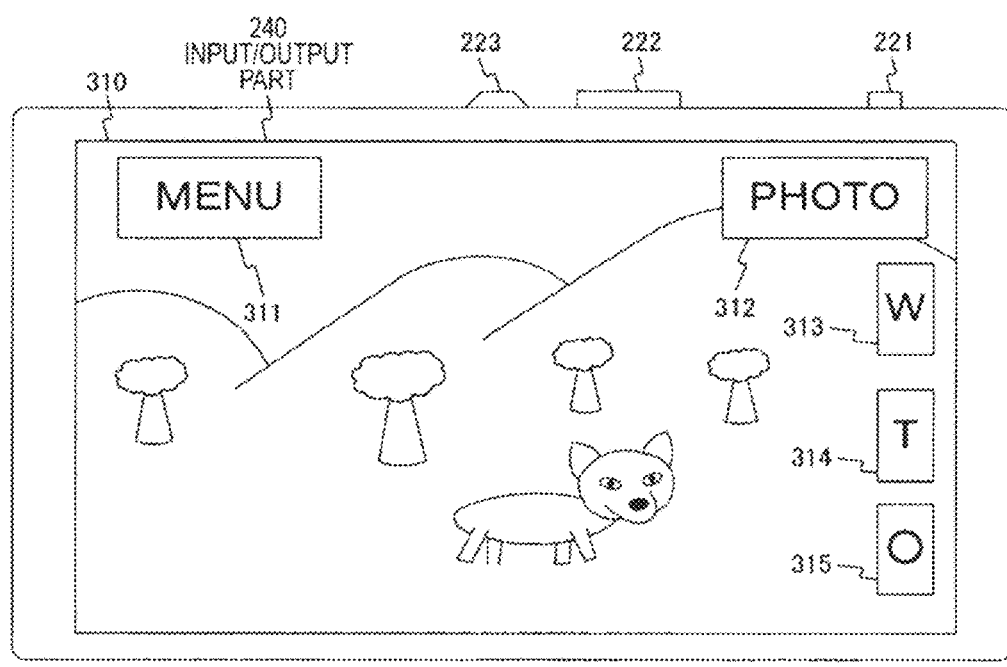
FIG. 7 is a diagram illustrating a display example of the display screen displayed at the input/output part 240 in the first embodiment of the present technology.

For instance, in the case that the imaging device 100 is in the state of being attached to the information processing device 200 and the imaging device 100 is held by a user, the user is assumed to photograph a moving image using the imaging device 100 and the information processing device 200 like a digital video camera. Therefore, in this case, the moving image mode is set in the imaging device 100, and the moving image photographing UI is displayed in the information processing device 200. A display example of the moving image photographing UI is illustrated in FIG. 7.

Figure 8:
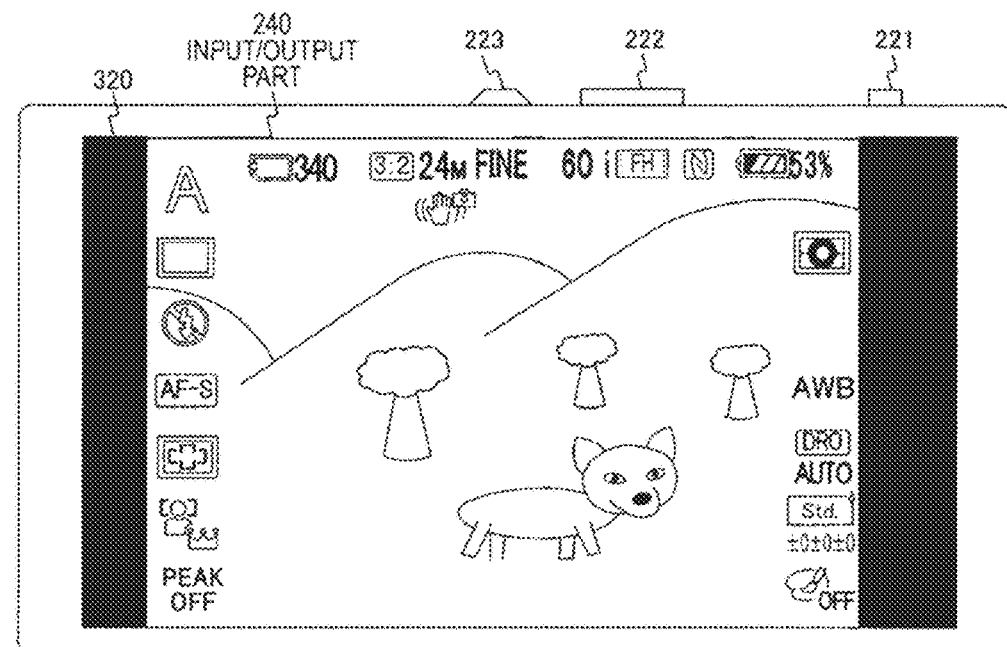
FIG. 8 is a diagram illustrating a display example of the display screen displayed at the input/output part 240 in the first embodiment of the present technology.

Also, for instance, in the case that the imaging device 100 is in the state of being attached to the information processing device 200 and the imaging device 100 is not held by a user, the user is assumed to photograph a still image using the imaging device 100 and the information processing device 200 like an incorporated type camera. Therefore, in this case, the still image mode is set in the imaging device 100, and the incorporated type camera UI is displayed in the information processing device 200. A display example of this moving image photographing UI is illustrated in FIG. 8.

Figure 6:
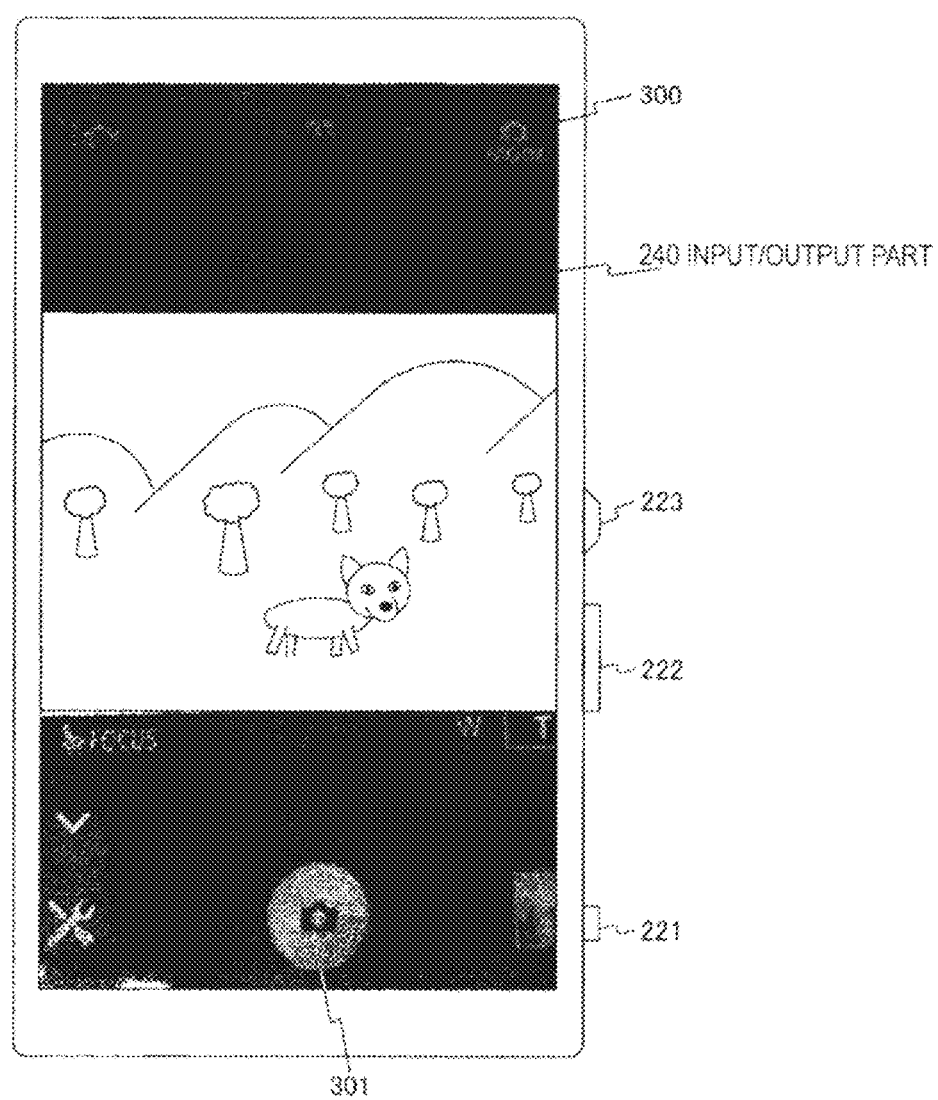
FIG. 6 is a diagram illustrating a display example of a display screen displayed at an input/output part 240 in the first embodiment of the present technology.

Also, for instance, in the case that the imaging device 100 is not attached to the information processing device 200, the user is assumed to perform the imaging operation while remotely controlling the imaging device 100 using the information processing device 200. Therefore, in this case, a remote UI is displayed at the information processing device 200. A display example of the remote UI is illustrated in FIG. 6.

"Example of Determining Connection Relation between Imaging Device and Information Processing Device"

Here, a method of determining connection relation between the imaging device 100 and the information processing device 200 will be described.

"Example of Estimating Distance Using Reception Radio Field Intensity"

For instance, a distance between the imaging device 100 and the information processing device 200 can be estimated using reception radio field intensity. For instance, a table indicating relationship between the reception radio field intensity and the distance is prepared, and stored in the storage part 270. Then, the control part 250 of the information processing device 200 acquires the distance corresponding to the reception radio field intensity acquired by the wireless communication part 230 from the table, and can use the distance as the distance between the imaging device 100 and the information processing device 200. Also, when the distance acquired from the table is shorter than a threshold (for instance, 1 to 10 cm), the control part 250 of the information processing device 200 can determine that the imaging device 100 is attached to the information processing device 200.

"Example of Using Member for Detecting Engagement"

For instance, engagement of the imaging device 100 can be detected using a member for detecting that the imaging device 100 is attached to the information processing device 200. As the member, for instance, a switch can be provided on at least one of the imaging device 100 and the information processing device 200.

For instance, the case of providing the switch on the imaging device 100 is assumed. In this case, when the imaging device 100 is attached to the information processing device 200, the engagement is detected by the switch, and information indicating that the engagement is detected is output to the control part 140. Then, when the information indicating that the engagement is detected is acquired, the control part 140 transmits that effect to the information processing device 200 through the wireless communication part 150. Thus, the control part 250 of the information processing device 200 can detect that the imaging device 100 is attached to the information processing device 200.

Also, for instance, the case of providing the switch on the information processing device 200 is assumed. In this case, when the imaging device 100 is attached to the information processing device 200, the engagement is detected by the switch, and the information indicating that the engagement is detected is output to the control part 250. Thus, the control part 250 of the information processing device 200 can detect that the imaging device 100 is attached to the information processing device 200.

Also, the distance between the imaging device 100 and the information processing device 200 may be detected using another sensor. For instance, a distance sensor (for instance, a sensor which detects the distance using infrared rays or ultrasonic waves) may be used. Also, for instance, the distance between the imaging device 100 and the information processing device 200 may be detected using a global positioning system (GPS). For instance, respective positions of the imaging device 100 and the information processing device 200 are acquired using the GPS, and the distance between the imaging device 100 and the information processing device 200 can be calculated on the basis of these positions. Also, when the calculated distance is shorter than the threshold (for instance, 1 to 10 cm), the control part 250 of the information processing device 200 can determine that the imaging device 100 is attached to the information processing device 200.

"Example of Detecting Engagement of Imaging Device Using Short-Range Wireless Communication"

For instance, engagement of the imaging device 100 with the information processing device 200 can be detected using short-range wireless communication. Here, an example of using near field communication (NFC) as the short-range wireless communication is illustrated.

For instance, in the NFC, periodical communication is performed between the devices. For instance, a polling command is issued periodically from the information processing device 200. The polling command is a command for discriminating an NFC tag determined by an NFC standard (for instance, see NFC Forum Type3 Tag Operation Specification NFC Forum-TS-Type-3-Tag_1.1).

For instance, when there is a response (polling response) to the periodically issued polling command, the information processing device 200 can determine that an adjacent device exists. Here, a distance at which data communication utilizing the NFC is possible is about 1 to 10 cm. Accordingly, when there is the polling response, the control part 250 of the information processing device 200 can determine that the imaging device 100 is attached to the information processing device 200.

Also, when there is no response (polling response) to the polling command, the information processing device 200 can determine that an adjacent device does not exist. In this case, the control part 250 of the information processing device 200 can determine that the imaging device 100 is not attached to the information processing device 200.

Here, the NFC is widely spread. Also, the NFC is often loaded on an information processing device such as a smartphone. Therefore, in the case of the information processing device loaded with the NFC, by detecting the attachment using the NFC, hardware may not necessarily be newly provided for performing the detection. Thus, a manufacturing cost of the information processing device can be reduced.

Here, for instance, it is also assumed that the imaging device is not attached to the information processing device and the imaging device and the information processing device are adjacent. In such a case, when engagement is detected using the short-range wireless communication other than the NFC, there is a risk of erroneous detection that the imaging device is attached. Then, in the embodiment of the present technology, the NFC is used as the short-range wireless communication. Thus, accuracy of detecting engagement of the imaging device can be improved.

"Example of Detecting Engagement of Imaging Device Using Check Command and Check Response"

The example of detecting engagement of the imaging device using the NFC is illustrated above. When detecting engagement of the imaging device using the NFC in this way, engagement of the imaging device may be detected using a check command and a check response.

For instance, the check command and the check response are exchanged, and when specifying information is included in the check response, it can be determined that the imaging device 100 is attached to the information processing device 200. Here, the specifying information is information (identification information) for specifying the imaging device 100. Also, the check command and the check response are commands for reading contents of an NFC tag. The command is defined in NFC Forum Type3 Tag Operation Specification.

For instance, as described above, the polling command is issued and a response (polling response) to the polling command is exchanged.

Then, when the polling response is received, the control part 250 of the information processing device 200 transmits the check command. When the check command is received, the control part 140 of the imaging device 100 transmits a response (check response) to the check command. In this case, the control part 140 of the imaging device 100 includes the specifying information (the information (identification information) for specifying the imaging device 100) in the check response and transmits it.

For instance, information indicating "ABC DSC/Lens-Style Camera" can be included in the check response and transmitted as the specifying information. Here, for instance, it is assumed that "ABC" is information indicating a name of a company which manufactures the imaging device 100, and "DSC" is information indicating that it is the imaging device. Also, it is assumed that "Lens-Style Camera" is information indicating that it is a lens style camera.

In this way, the control part 140 of the imaging device 100 includes the specifying information in the check response and transmits it. Thus, the information processing device 200 which receives the check response can recognize that the device which has transmitted the check response is the imaging device 100 on the basis of the specifying information included in the check response. That is, it can be recognized that the device which has transmitted the check response is the lens style camera (the imaging device 100) made by the company "ABC".

When the check response is received, the control part 250 of the information processing device 200 acquires contents of the check response. Subsequently, the control part 250 of the information processing device 200 determines whether or not the specifying information is included in the check response. Then, in the case that the specifying information is included in the check response, the control part 250 of the information processing device 200 determines that the imaging device 100 is attached to the information processing device 200. On the other hand, in the case that the specifying information is not included in the check response, the control part 250 of the information processing device 200 determines that the imaging device 100 is not attached to the information processing device 200.

In this example, the example that the information processing device 200 detects of detecting engagement of the imaging device 100 using the NFC is illustrated, however, it is similarly applicable to the case that the imaging device 100 detects engagement of the information processing device 200 using the NFC.

The above-described distance detection method and engagement detection method are examples, and other detection methods may be used without being limited to these methods.

"Display Example of Display Screen"

FIG. 6 to FIG. 8 are diagrams illustrating display examples of a display screen displayed at the input/output part 240 in the first embodiment of the present technology.

FIG. 6 illustrates a display example (remote UI 300) of a display screen displayed at the input/output part 240 in the case that the imaging device 100 is not attached to the information processing device 200. The remote UI 300 is a display screen for operating the imaging operation (the imaging operation of the still image) by the imaging device 100 using the information processing device 200. Also, in FIG. 6, a display example in the case that the information processing device 200 is used in the vertical state is illustrated.

For instance, in the case that the imaging operation (for instance, the imaging operation of the still image) is being performed using the imaging device 100 and the information processing device 200, an image generated by the imaging part 110 of the imaging device 100 is displayed at the input/output part 240 as a live view image. That is, the image generated by the imaging part 110 of the imaging device 100 is successively transmitted to the information processing device 200 through the wireless communication parts 150 and 230, and the image is displayed at the input/output part 240 as the live view image. Also, the image data and the control data can be exchanged between the imaging device 100 and the information processing device 200 utilizing the Wi-Fi.

In the case that the live view image is displayed at the input/output part 240 in this way, when a user depresses the shutter button 301, recording processing of the image generated by the imaging part 110 is performed at the timing of the depression. Then, the image to be a target of the recording processing is displayed at the input/output part 240 as a post view image 300.

Also, a user may instruct recording of the image by depressing a shutter button (not shown in the figure) of the imaging device 100. In this case, the recording processing of the image generated by the imaging part 110 is performed at the timing of the depression. Also, the fact that the depression has been performed and the fact that the recording processing of the image is to be performed by the depression are transmitted from the imaging device 100 to the information processing device 200 at the timing of the depression.

FIG. 7 illustrates a display example (moving image photographing UI 310) of a display screen displayed at the input/output part 240 in the case that the imaging device 100 is attached to the information processing device 200 and the imaging device 100 is held. The moving image photographing UI 310 is a display screen for operating the imaging operation (the imaging operation of the moving image) by the imaging device 100 using the information processing device 200. Also, similarly to the display example illustrated in FIG. 6, the image generated by the imaging part 110 of the imaging device 100 is displayed at the input/output part 240 as a live view image.

As described above, in the case of photographing a moving image using a general digital video camera, it is often performed in the state of holding a main body of the digital video camera with four fingers (from a pointing finger to a little finger) of the right hand. By holding the main body of the digital video camera in this way, a user can easily perform individual operations such as a zoom operation, a recording start operation and a recording stop operation with the thumb of the right hand using a display panel and other operation members (hard keys). In this way, in the case of photographing the moving image using the general digital video camera, a user can perform operations with one hand (right hand).

Accordingly, in the case that the imaging device 100 is attached to the information processing device 200, on the display screen (moving image photographing UI 310) displayed at the input/output part 240 of the information processing device 200, operation objects 312-315 frequently used in the operation of photographing a moving image are arranged on the right side. Also, the operation object 312 is an operation object to be depressed in the case of shifting to the still image mode. Also, the operation objects 313 and 314 are operation objects to be depressed in the case of performing the zoom operation. Also, the operation object 315 is an operation object to be depressed in the case of performing the recording start operation and the recording stop operation. Thus, a user can easily perform the individual operations using the thumb of the right hand in the moving image photographing UI 310. Thus, the user can achieve an operating feeling similar to that for the general digital video camera. Also, the user can easily perform the operations with one hand. In the moving image photographing UI 310, an operation object 311 which is not frequently used in the operation of photographing the moving image can be arranged on the left side.

FIG. 8 illustrates a display example (incorporated type camera UI 320) of a display screen displayed at the input/output part 240 in the case that the imaging device 100 is attached to the information processing device 200 but the imaging device 100 is not held. The incorporated type camera UI 320 is a display screen for operating the imaging operation (the imaging operation of the still image) by the imaging device 100 using the information processing device 200. Also, similarly to the display example illustrated in FIG. 6, the image generated by the imaging part 110 of the imaging device 100 is displayed at the input/output part 240 as a live view image.

"Operation Example of Imaging Device"

Figure 9:
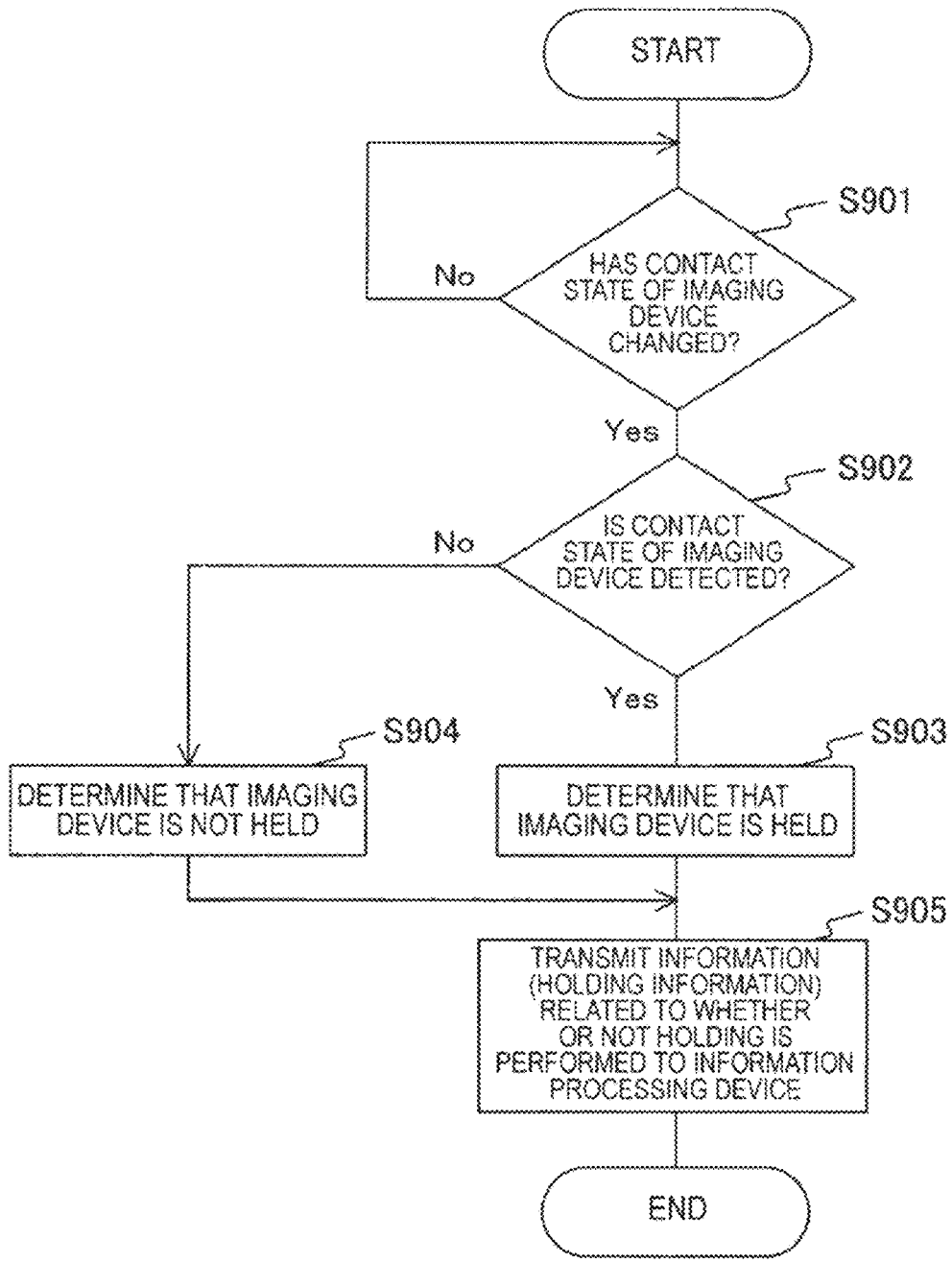
FIG. 9 is a flowchart illustrating one example of a processing procedure of holding determination processing by the imaging device 100 in the first embodiment of the present technology.

FIG. 9 is a flowchart illustrating one example of a processing procedure of holding determination processing by the imaging device 100 in the first embodiment of the present technology.

First, the control part 140 determines whether or not the contact state has changed on the basis of the contact information from the contact detection part 160 (step S901). For instance, the case that the contact detection part 160 is constituted of a plurality of sensors is assumed. In this case, in the case that the number of the sensors that detect contact has changed, the control part 140 can determine that the contact state has changed. Also, it may be determined that the contact state has changed only in the case that the change of a fixed amount (for instance, the number which is around 20 percent of the whole) or more has occurred. Then, in the case that the contact state has not changed (step S901), monitoring is continuously performed.

Also, in the case that the contact state has changed (step S901), the control part 140 determines whether or not the contact is detected on the side face of the imaging device 100 (step S902).

In the case that the contact is detected on the side face of the imaging device 100 (step S902), the control part 140 determines that the imaging device 100 is held (step S903). Then, the control part 140 transmits information (holding information) indicating that effect to the control part 250 of the information processing device 200 through the wireless communication part 150 and the wireless communication part 230 of the information processing device 200 (step S905).

Also, in the case that the contact is not detected on the side face of the imaging device 100 (step S902), the control part 140 determines that the imaging device 100 is not held (step S904). Then, the processing advances to step S905.

Also, in the case that the contact state has changed (step S901), the control part 140 may determine whether or not the contact is detected in the prescribed area on the side face of the imaging device 100 (step S902). Here, the prescribed area is, for instance, an area to be highly possibly held by a user in the case of photographing a moving image. For instance, an area on the right side of the imaging device 100 can be the prescribed area.

"Operation Example of Information Processing Device"

Figure 10:
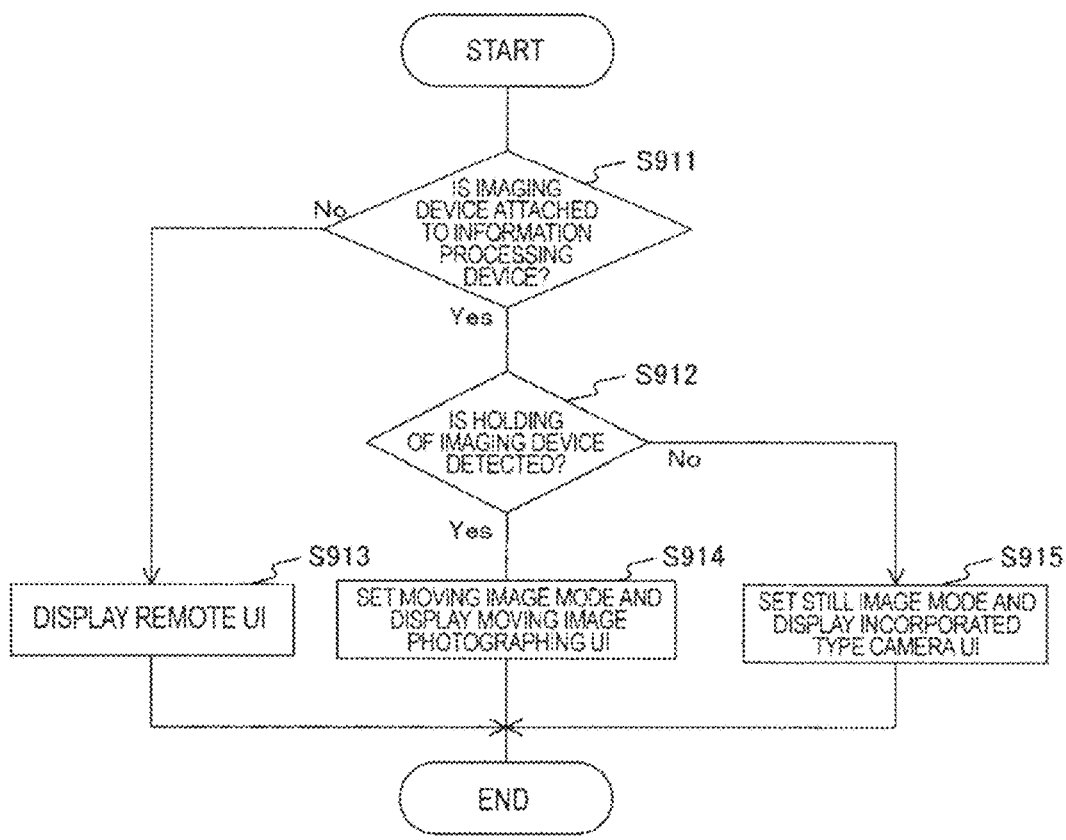
FIG. 10 is a flowchart illustrating one example of a processing procedure of imaging mode and UI setting processing by the information processing device 200 in the first embodiment of the present technology.

FIG. 10 is a flowchart illustrating one example of a processing procedure of imaging mode and UI setting processing by the information processing device 200 in the first embodiment of the present technology.

First, the control part 250 determines whether or not the imaging device 100 is attached to the information processing device 200 (step S911). In the case that the imaging device 100 is not attached to the information processing device 200 (step S911), the control part 250 makes the input/output part 240 display the remote UI (step S913). For instance, the remote UI 300 illustrated in FIG. 6 is displayed at the input/output part 240.

In the case that the imaging device 100 is attached to the information processing device 200 (step S911), the control part 250 determines whether or not the imaging device 100 is held, on the basis of the holding information from the imaging device 100 (step S912).

In the case that the imaging device 100 is held (step S912), the control part 250 sets the moving image mode in the imaging device 100, and makes the input/output part 240 display the moving image photographing UI (step S914). For instance, the moving image photographing UI 310 illustrated in FIG. 7 is displayed at the input/output part 240. Also, in the case of setting the moving image mode, the control part 250 transmits control information for setting the moving image mode to the imaging device 100.

Also, in the case that the imaging device 100 is not held (step S912), the control part 250 sets the still image mode in the imaging device 100, and makes the input/output part 240 display the incorporated type camera UI (step S915). For instance, the incorporated type camera UI 320 illustrated in FIG. 8 is displayed at the input/output part 240. Also, in the case of setting the still image mode, the control part 250 transmits control information for setting the still image mode to the imaging device 100. Also, steps S912, S914 and S915 are examples of a control procedure described in the scope of claims.

2. Second Embodiment

In the first embodiment of the present technology, an example of setting the imaging mode and the UI on the basis of the holding state of the imaging device is illustrated. Here, for instance, in the case that the imaging device is attached to the information processing device, it is assumed that a photographing method to be used by a user can be determined by the attaching position as well.

Accordingly, in the second embodiment of the present technology, an example of setting (switching) the imaging mode and the UI on the basis of the holding state of the imaging device and the attaching position of the imaging device in the information processing device will be illustrated. Also, the configuration of the imaging device and the information processing device in the second embodiment of the present technology is the same as the imaging device 100 and the information processing device 200 illustrated in FIG. 1 to FIG. 3. Therefore, for the respective devices in the second embodiment of the present technology, the same reference numerals are attached as the first embodiment of the present technology, and part of the description thereof is omitted.

"Example of Determining Attaching Position"

First, a determination method for determining the attaching position of the imaging device 100 will be described.

"Example of Determination Using Detection Member"

For instance, the information processing device 200 is provided with a detection member for detecting engagement of the imaging device 100. For instance, the detection member is provided on both ends (both ends in the longitudinal direction of the information processing device 200) on each of a front surface (the surface provided with the input/output part 240) and a back surface (the surface provided with the imaging part 292) of the information processing device 200. As the detection member, for instance, a switch or a sensor for detecting engagement of the imaging device 100 can be used. Then, using the detection member, to which part of the front surface and the back surface of the information processing device 200 the imaging device 100 is attached can be detected.

"Example of Determination Using Input/output Part"

For instance, a distance between the imaging device 100 and the information processing device 200 can be estimated using the input/output part 240. Here, the case of using a projection-based electrostatic capacity type touch panel as the input/output part 240 is assumed. In this case, for the mounting surface 185 (illustrated in FIG. 1b) of the imaging device 100 to the information processing device 200, a material that reacts to the projection-based electrostatic capacity type touch panel is adopted. The material is, for instance, conductive silicon rubber.

For instance, in the case that the imaging device 100 is attached to the display surface of the input/output part 240, since the above-described material (for instance, the conductive silicon rubber) is adopted for the mounting surface 185 of the imaging device 100, the input/output part 240 can detect the imaging device 100. In this case, the control part 250 can determine whether or not the imaging device 100 is attached to the display surface of the input/output part 240, on the basis of a size of the detected object. For instance, a size (surface area) of the mounting surface 185 of the imaging device 100 is stored in the storage part 270. Then, the control part 250 compares the size of the detected object with the size stored in the storage part 270, and determines whether or not they coincide or roughly coincide. Here, rough coincidence means the case that a difference value between the size of the detected object and the size stored in the storage part 270 is small with a threshold as a reference.

Then, in the case that the size of the detected object and the size stored in the storage part 270 coincide or roughly coincide, the control part 250 can determine that the imaging device 100 is attached to the display surface of the input/output part 240. On the other hand, in the case that the size of the detected object and the size stored in the storage part 270 do not coincide and do not even roughly coincide, the control part 250 can determine that the imaging device 100 is not attached to the display surface of the input/output part 240.

Also, the input/output part 240 can detect a position of the imaging device 100 on the display surface. That is, in the case that the input/output part 240 is the projection-based electrostatic capacity type touch panel, the position and the size of the imaging device 100 attached to the display surface of the input/output part 240 can be detected.

Also, for instance, in the case that the input/output part 240 is an optical sensor type touch panel, the position and the size of the imaging device 100 attached to the display surface of the input/output part 240 can be detected.

"Use Example of Imaging Device and Information Processing Device"

FIG. 11 is a diagram illustrating a use example of the imaging device 100 and the information processing device 200 in the second embodiment of the present technology. In FIG. 11, for easy description, a part of the imaging device 100 and the information processing device 200 is illustrated in a simplified manner.

Figure 11A:
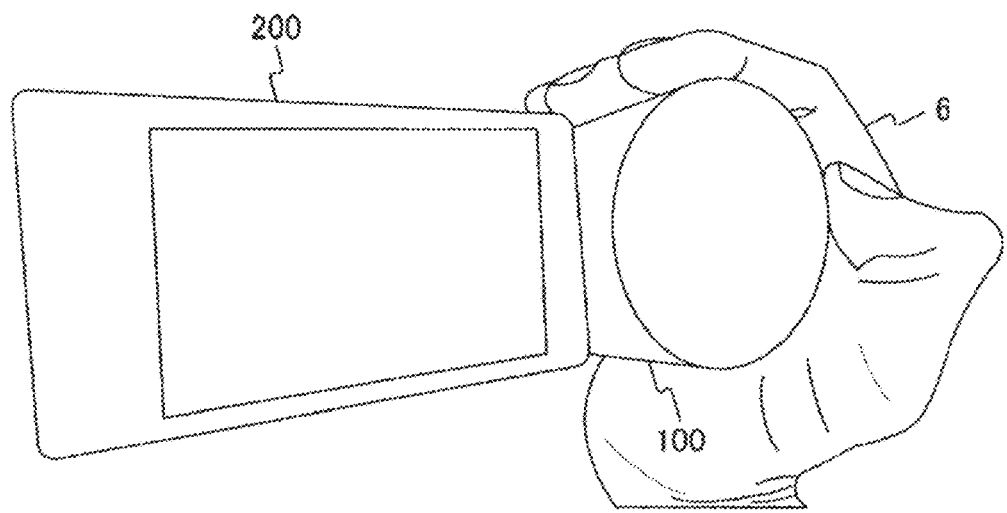
FIG. 11 is a diagram illustrating a use example of the imaging device 100 and the information processing device 200 in a second embodiment of the present technology.
Figure 11B:
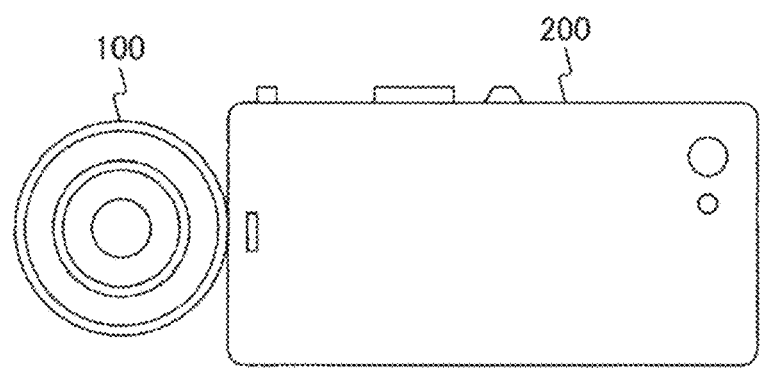

In FIG. 11a, a perspective view in the case of attaching the side face of the imaging device 100 and the side face of the information processing device 200 and using them is illustrated. In FIG. 11b, a front view in the case of attaching the side face of the imaging device 100 and the side face of the information processing device 200 and using them is illustrated.

In the case of attaching the side face of the imaging device 100 and the side face of the information processing device 200 and using them in this way, it is assumed that, even in the state of holding the imaging device 100 with the right hand 6 of a user, the thumb of the right hand 6 does not reach the input/output part 240 of the information processing device 200. Therefore, in the case of attaching the side face of the imaging device 100 and the side face of the information processing device 200 and using them, it is preferable to display the UI that is easy to operate with the left hand. The display example is illustrated in FIG. 13.

"Setting Example of Imaging Mode and UI"

FIG. 12 is a diagram illustrating an example of a relation between the imaging mode set to the imaging device 100 and the information processing device 200 and the UI displayed at the information processing device 200 in the second embodiment of the present technology.

In the second embodiment of the present technology, an example of setting the imaging mode and UI display according to the attaching position of the imaging device 100 to the information processing device 200 will be illustrated.

For instance, as illustrated in FIG. 11, in the case that the side face of the imaging device 100 and the side face of the information processing device 200 are attached, it is assumed that a user photographs a moving image in the state of holding the imaging device 100 with the right hand.

Accordingly, in this case, the moving image mode is set in the imaging device 100, and a second moving image photographing UI is displayed in the information processing device 200. A display example of the second moving image photographing UI is illustrated in FIG. 13.

Also, in the case that the imaging device 100 is attached to the front face of the information processing device 200, or in the case that the imaging device 100 is not attached to the information processing device 200, since it is similar to the example illustrated in FIG. 5, description here is omitted. Also, a first moving image photographing UI illustrated in FIG. 12 corresponds to the moving image photographing UI illustrated in the first embodiment of the present technology.

"Display Example of Display Screen"

FIG. 13 is a diagram illustrating a display example of the display screen displayed at the input/output part 240 in the second embodiment of the present technology.

In FIG. 13, the display example (second moving image photographing UI 330) of the display screen displayed at the input/output part 240 in the case that the side face of the imaging device 100 and the side face of the information processing device 200 are attached is illustrated. The second moving image photographing UI 330 is a display screen for operating the imaging operation (the imaging operation of the moving image) by the imaging device 100 using the information processing device 200. Also, similarly to the display example illustrated in FIG. 6, the image generated by the imaging part 110 of the imaging device 100 is displayed at the input/output part 240 as a live view image.

"Operation Example of Information Processing Device"

Figure 14:
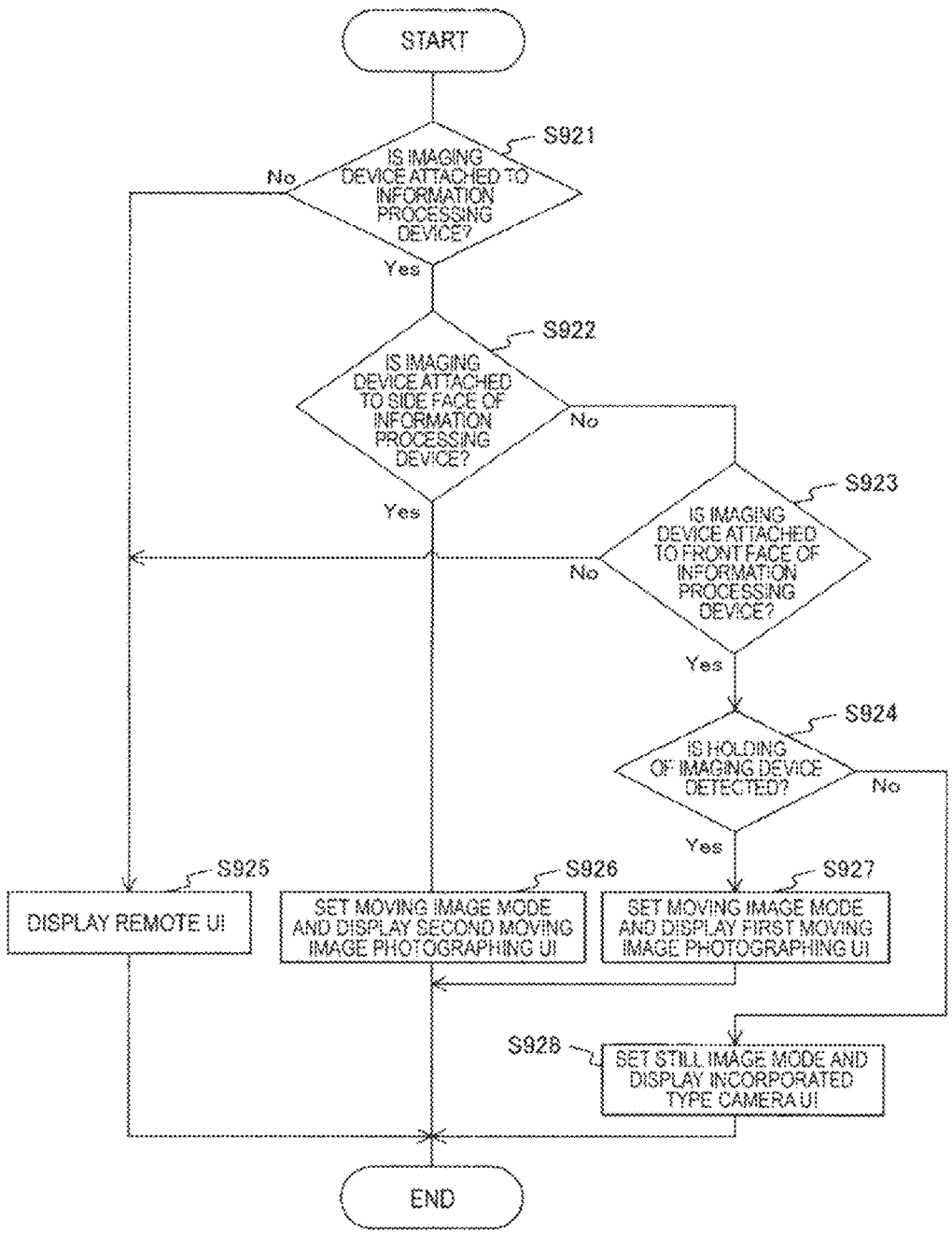
FIG. 14 is a flowchart illustrating one example of the processing procedure of the imaging mode and UI setting processing by the information processing device 200 in the second embodiment of the present technology.

FIG. 14 is a flowchart illustrating one example of the processing procedure of the imaging mode and UI setting processing by the information processing device 200 in the second embodiment of the present technology. Since steps S921, S924, S925, S927 and S928 correspond to steps S911-S915 illustrated in FIG. 10, the description here is omitted.

In the case that the imaging device 100 is attached to the information processing device 200 (step S921), the control part 250 determines whether or not the imaging device 100 is attached to the side face of the information processing device 200 (step S922). For instance, a detection member (for instance, a switch) for detecting engagement of the imaging device 100 is provided on the side face of the information processing device 200, and the engagement of the imaging device 100 to the side face of the information processing device 200 can be detected by the detection member.

In the case that the imaging device 100 is attached to the side face of the information processing device 200 (step S922), the control part 250 sets the moving image mode in the imaging device 100, and makes the input/output part 240 display the second moving image photographing UI (step S926). For instance, the second moving image photographing UI 330 illustrated in FIG. 13 is displayed at the input/output part 240. Also, in the case of setting the moving image mode, the control part 250 transmits the control information for setting the moving image mode to the imaging device 100.

In the case that the imaging device 100 is not attached to the side face of the information processing device 200 (step S922), the control part 250 determines whether or not the imaging device 100 is attached to the front face of the information processing device 200 (step S923). For instance, a detection member (for instance, a switch) for detecting engagement of the imaging device 100 is provided on the front face of the information processing device 200, and engagement of the imaging device 100 to the front face of the information processing device 200 can be detected by the detection member.

In the case that the imaging device 100 is attached to the front face of the information processing device 200 (step S923), the processing advances to step S924. On the other hand, in the case that the imaging device 100 is not attached to the front face of the information processing device 200 (step S923), the processing advances to step S925.

In this way, the control part 250 can control the imaging operation on the basis of a mounting position of the imaging device 100 in the information processing device 200 and the contact information transmitted from the imaging device 100.

A detection method of detecting engagement of the imaging device 100 to the side face or the front face of the information processing device 200 is one example, and other detection methods may be also used.

"Other Attachment Examples"

FIG. 15 is a diagram illustrating an attachment example of the imaging device 100 and the information processing device 200 in the second embodiment of the present technology.

Figure 15A:
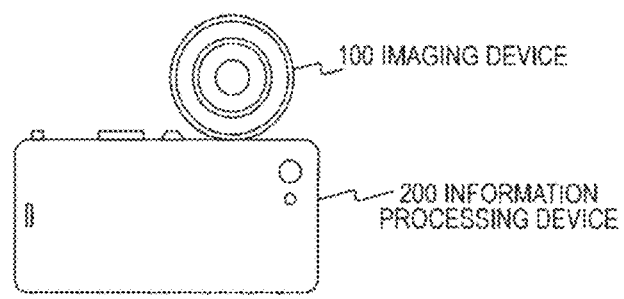
FIG. 15 is a diagram illustrating an attachment example of the imaging device 100 and the information processing device 200 in the second embodiment of the present technology.
Figure 15B:
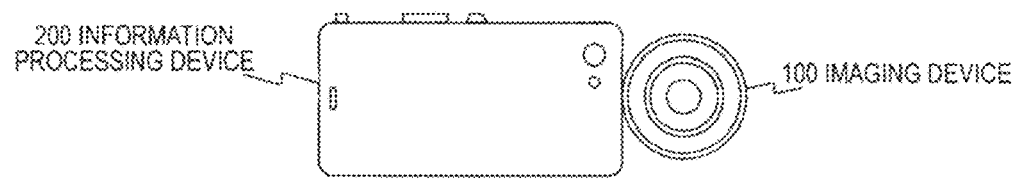
Figure 15C:
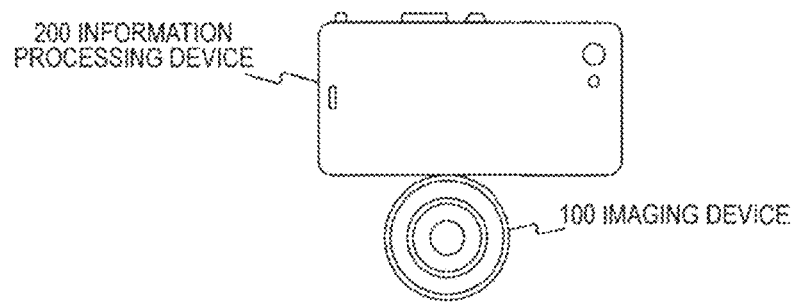

As illustrated in FIG. 15a to FIG. 15c, for instance, the imaging device 100 can be attached to the side face (the side face in the information processing device 200) different from the example illustrated in FIG. 11. In these cases, the imaging device 100 can be attached to the information processing device 200 using an attachment member different from the attachment members 181 and 182 illustrated in FIG. 1 and FIG. 2 or the like. Thus, the imaging device 100 can be attached to a position (the position in the information processing device 200) according to user's preference. Also, setting of the imaging mode and the UI according to the attaching position of the imaging device 100 may be changed according to user's preference.

In this way, according to the embodiment of the present technology, the imaging operation can be appropriately controlled according to the using mode of the imaging device 100 and the information processing device 200. For instance, the imaging operation can be appropriately controlled according to the way of holding the imaging device 100. In this case, for instance, the appropriate imaging mode and UI according to the way of holding the imaging device 100 can be set.

Also, while the example of setting the imaging mode and the UI under the control of the information processing device 200 is illustrated in the embodiment of the present technology, the imaging mode and the UI may be set under the control of the imaging device 100. For instance, the control part 140 of the imaging device 100 can perform control for setting the imaging mode and the UI, on the basis of the contact information from the contact detection part 160 and presence/absence of engagement to the information processing device 200. In this case, the control part 140 of the imaging device 100 can set the UI in the information processing device 200 by notifying the control part 250 of the information processing device 200 of information related to the UI to be set through the wireless communication part 150 and the wireless communication part 230. That is, the control part 140 of the imaging device 100 can control the imaging operation on the basis of the contact state of an object in the lens barrel 170.

Also, while the example in which the imaging device 100 and the information processing device 200 are different devices is illustrated in the embodiment of the present technology, the embodiment of the present technology is applicable also to one device (for instance, an information processing device provided with an imaging part (including a lens barrel)). For instance, the embodiment of the present technology is applicable also to an incorporated type camera. For instance, on the basis of the contact state of an object (for instance, the contact state of a hand by a user) in a lens barrel that houses an optical system, the imaging mode (the still image mode, the moving image mode) and the UI can be set.

Also, while the example of detecting the contact state of an object in the lens barrel 170 of the imaging device 100 on the side of the imaging device 100 is illustrated in the embodiment of the present technology, the contact state of an object in the lens barrel 170 of the imaging device 100 may be detected on the side of the information processing device 200. For instance, the information processing device 200 is provided with a touch sensor, and the contact state of an object in the information processing device 200 (the holding state of the information processing device 200) is detected. Also, it is preferable to detect the contact state of an object and an engagement state of the imaging device 100 by different detection methods. Also, movement of the information processing device 200 is detected by the posture detection part 210 (for instance, a posture detection sensor, GPS) of the information processing device 200. In this case, in the case that the movement of the information processing device 200 is detected and the contact of an object in the information processing device 200 is not detected, it can be determined that the imaging device 100 is held.

Also, the display form may be switched in the state that the same imaging mode is set. For instance, in the state that the moving image mode is set, either one of the UI of the still image and the UI of the moving image can be displayed.

While the embodiment of the present technology is described taking a cylindrical (columnar) imaging device 100 as an example, the embodiment of the present technology is applicable also to the imaging devices in other shapes, that can be attached to the other device. Also, the embodiment of the present technology is applicable also to imaging devices that can be connected to the other device utilizing the wireless communication (for instance, the Wi-Fi). Also, the embodiment of the present technology is described taking the information processing device 200 such as a smartphone or table terminal or the like as an example, the embodiment of the present technology is applicable also to the other devices that can be connected with the imaging device utilizing the wireless communication.

Also, the above-described embodiment illustrates one example for realizing the present technology, and matters in the embodiment and technology specifying matters in the scope of claims have correspondence relation respectively. Similarly, the technology specifying matters in the scope of claims and the matters in the embodiment of the present technology, to which the same names are attached, have the correspondence relation respectively. However, the present technology is not limited to the embodiment and can be realized by variously modifying the embodiment without departing from the spirit of the technology.

Also, the processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a computer disc (CD), a minidisc (MD), a digital versatile disc (DVD), a memory card, and a Blu-ray® disc or the like are usable.

Effects described in the present description are just examples, the effects are not limited, and there may be other effects.

Additionally, the present technology may also be configured as below.

(1)

An information processing device including:

a control part configured to control an imaging operation on the basis of a contact state of an object in a lens barrel that houses an optical system.

(2)

The information processing device according to (1), wherein the control part determines whether or not the lens barrel is in a state of being held by a user on the basis of whether or not contact of an object is detected on a side face of the lens barrel, and controls the imaging operation on the basis of the determination result.

(3)

The information processing device according to (2), wherein the control part determines that the lens barrel is in the state of being held by a user in a case that the contact of the object is detected in a prescribed area on the side face of the lens barrel.

(4)

The information processing device according to any one of (1) to (3), further including:

a wireless communication part configured to perform wireless communication with an imaging device including the lens barrel, wherein the imaging device transmits contact information related to a contact state of an object in the lens barrel to the information processing device utilizing the wireless communication, and wherein the control part controls the imaging operation on the basis of the contact information.

(5)

The information processing device according to (4), wherein the control part controls the imaging operation on the basis of a relative positional relation with the imaging device and the contact information.

(6)

The information processing device according to (5), wherein the control part performs control for setting a moving image mode to the imaging device in a case that the imaging device is attached to the information processing device and the contact of the object is detected by the imaging device.

(7)

The information processing device according to (6), wherein the control part performs control of making a display part display a display screen corresponding to the moving image mode in the case that the imaging device is attached to the information processing device and the contact of the object is detected by the imaging device.

(8)

The information processing device according to any one of (5) to (7), wherein the control part performs control for setting a still image mode to the imaging device in a case that the imaging device is attached to the information processing device and the contact of the object is not detected by the imaging device.

(9)

The information processing device according to (8), wherein the control part performs control of making a display part display a display screen corresponding to the still image mode in the case that the imaging device is attached to the information processing device and the contact of the object is not detected by the imaging device.

(10)

The information processing device according to any one of (5) to (9), wherein the control part controls the imaging operation on the basis of a mounting position of the imaging device in the information processing device and the contact information.

(11)

The information processing device according to any one of (1) to (10), wherein the control part performs control of setting an imaging mode for performing the imaging operation on the basis of the contact state of the object.

(12)

The information processing device according to any one of (1) to (11), wherein the control part performs control of changing a display form of a display screen that displays an image related to the imaging operation on the basis of the contact state of the object.

(13)

An imaging device including:

a control part configured to control an imaging operation on the basis of a contact state of an object in a lens barrel that houses an optical system.

(14)

An imaging system including:

an imaging device that includes a contact detection part configured to detect contact of an object in a lens barrel that houses an optical system, and a control part configured to perform control of transmitting contact information related to the detected contact of the object to the information processing device utilizing wireless communication; and an information processing device that includes a wireless communication part configured to perform the wireless communication with the imaging device, and a control part configured to control an imaging operation performed using the imaging device on the basis of the contact information.

(15)

A control method of an information processing device including:

a control procedure of controlling an imaging operation on the basis of a contact state of an object in a lens barrel that houses an optical system.

(16)

A program that makes a computer execute a control procedure of controlling an imaging operation on the basis of a contact state of an object in a lens barrel that houses an optical system.

REFERENCE SIGNS LIST 100 imaging device
110 imaging part
120 image processing part
130 storage part
140 control part
150 wireless communication part
160 contact detection part
170 lens barrel
180 adaptor
181, 182 attachment member
185 mounting surface
200 information processing device
210 posture detection part
220 operation reception part
221-223 operation member
230 wireless communication part
240 input/output part
241 input part
242 display part
250 control part
260 image processing part
270 storage part
280 sound output part
291 light emitting part
292 imaging part

The invention claimed is:

1. An information processing device, comprising:
circuitry configured to:
receive information associated with a user's contact on a lens barrel, wherein the information comprises a contact area of the lens barrel that is in the user's contact;
determine, based on the received information, a state of an imaging device,
wherein the imaging device comprises the lens barrel, and
wherein the state corresponds to a holding state of the imaging device with respect to the user's contact;
control, an imaging operation of the imaging device, based on the determined state and a relative positional relation of the information processing device with the imaging device; and
set a moving image mode to the imaging device based on attachment of the imaging device with the information processing device and the contact area that exceeds a threshold area.

2. The information processing device according to claim 1, wherein the circuitry is further configured to:
determine the state, based on a contact of an object on a side face of the lens barrel, wherein the contact area is on the side face of the lens barrel.

3. The information processing device according to claim 2, wherein the contact of the object is in a first area on the side face of the lens barrel.

4. The information processing device according to claim 1, wherein the circuitry is further configured to control a display device, to display a user interface corresponding to the moving image mode.

5. The information processing device according to claim 1, wherein the circuitry is further configured to set a still image mode to the imaging device based on attachment of the imaging device with the information processing device and the contact area that is less than a threshold area.

6. The information processing device according to claim 5, wherein the circuitry is further configured to control a display device, to display a user interface corresponding to the still image mode.

7. The information processing device according to claim 1, wherein the circuitry is further configured to control, the imaging operation of the imaging device, based on a mounting position of the imaging device on the information processing device and the contact area.

8. The information processing device according to claim 7, wherein the mounting position is on one of a side face or a front face of the information processing device.

9. The information processing device according to claim 7, wherein the circuitry is further configured to control a display device, to display a user interface based on the mounting position.

10. The information processing device according to claim 1, wherein the circuitry is further configured to set an imaging mode for the imaging operation based on the state.

11. The information processing device according to claim 1, wherein the circuitry is further configured to control, based on the state, a display device to display a user interface related to the imaging operation.

12. An imaging device, comprising:
a lens barrel; and
first circuitry configured to:
  detect a user's contact on the lens barrel;
  determine, based on the detection of the user's contact, information associated with the user's contact, wherein the information comprises a contact area of the lens barrel that is in the user's contact; and
  transmit to an information processing device, the determined information,
  wherein the information processing device:
    determines a first state of the imaging device, based on the determined information,
    wherein the first state corresponds to a holding state of the imaging device with respect to the user's contact,
    controls, an imaging operation of the imaging device, based on the determined state and a relative positional relation of the information processing device with the imaging device, and
    sets a moving image mode to the imaging device based on attachment of the imaging device with the information processing device and the contact area that exceeds a threshold area.

13. An imaging system, comprising:
an imaging device that includes first circuitry and a lens barrel, wherein the first circuitry is configured to:
  detect a user's contact on the lens barrel;
  determine, based on the detection of the user's contact, information associated with the user's contact, wherein the information comprises a contact area of a lens barrel that is in the user's contact; and
  transmit, to an information processing device, the determined information; and
the information processing device that includes second circuitry, wherein the second circuitry is configured to:
  receive the information from the imaging device;
  determine, based on the received information, a first state of the imaging device,
    wherein the first state corresponds to a holding state of the imaging device with respect to the user's contact;
  control an imaging operation of the imaging device based on the determined first state and a relative positional relation of the information processing device with the imaging device; and
  set a moving image mode to the imaging device based on attachment of the imaging device with the information processing device and the contact area that exceeds a threshold area.

14. An information processing method, comprising:
receiving information associated with a user's contact on a lens barrel, wherein the information comprises a contact area of the lens barrel that is in the user's contact;
determining, based on the received information, a state of an imaging device,
  wherein the imaging device comprises the lens barrel, and
  wherein the state corresponds to a holding state of the imaging device with respect to the user's contact;
controlling an imaging operation of the imaging device based on the determined state and a relative positional relation of information processing device with the imaging device; and
setting a moving image mode to the imaging device based on attachment of the imaging device with the information processing device and the contact area that exceeds a threshold area.

15. A non-transitory computer readable medium having stored thereon, computer-executable instructions which when executed by an information processing device, cause the information processing device to execute operations, the operations comprising:
receiving information associated with a user's contact on a lens barrel, wherein the information comprises a contact area of the lens barrel that is in the user's contact;
determining, based on the received information, a state of an imaging device,
  wherein the imaging device comprises the lens barrel, and
  wherein the state corresponds to a holding state of the imaging device with respect to the user's contact;
controlling an imaging operation of the imaging device based on the determined state and a relative positional relation of the information processing device with the imaging device; and
setting a moving image mode to the imaging device based on attachment of the imaging device with the information processing device and the contact area that exceeds a threshold area.

* * * * *